April 19, 1960 E. T. DALTON 2,932,925
APPARATUS AND METHOD OF FORMING OPHTHALMIC LENSES
Original Filed Feb. 20, 1956 9 Sheets-Sheet 1

INVENTOR
ERNEST T. DALTON
BY
*Louis L. Gagnon*
ATTORNEY

April 19, 1960      E. T. DALTON      2,932,925
APPARATUS AND METHOD OF FORMING OPHTHALMIC LENSES
Original Filed Feb. 20, 1956      9 Sheets-Sheet 2
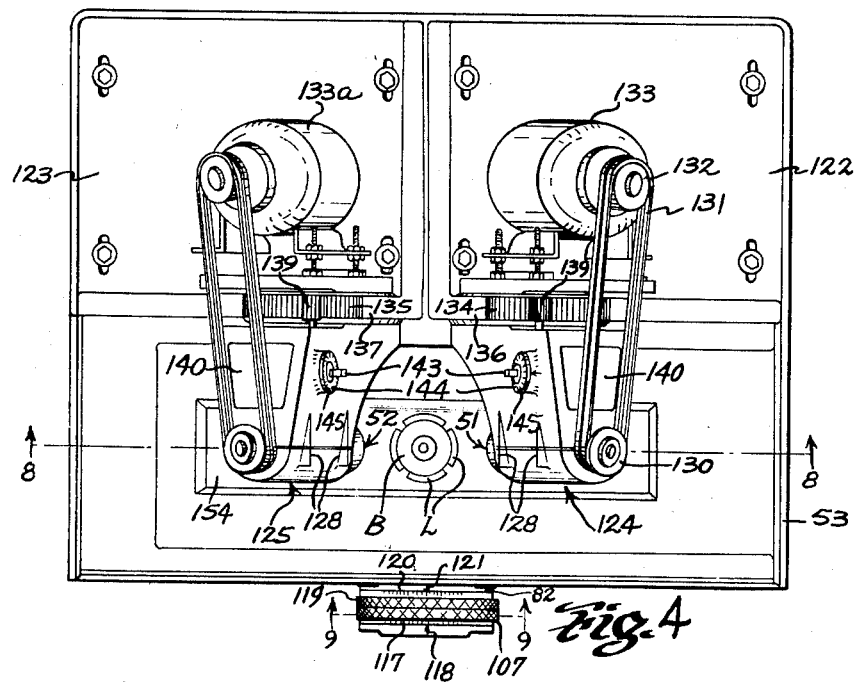
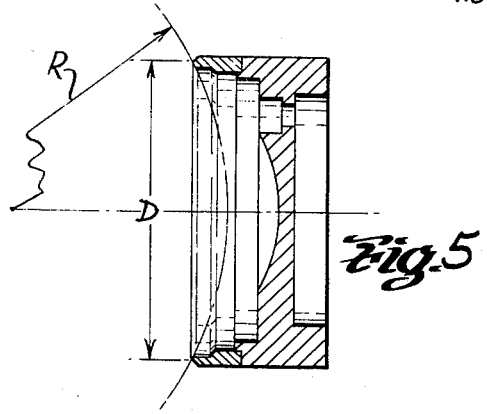
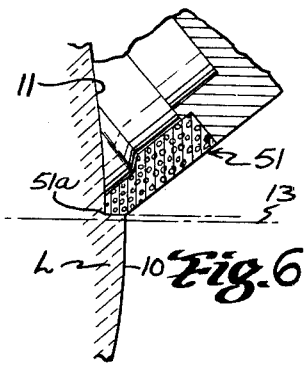
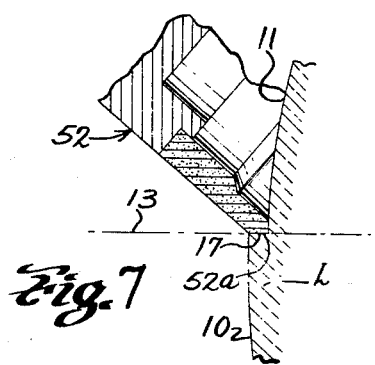
INVENTOR
ERNEST T. DALTON
BY
Louis L. Gagnon
ATTORNEY April 19, 1960 E. T. DALTON 2,932,925
APPARATUS AND METHOD OF FORMING OPHTHALMIC LENSES
Original Filed Feb. 20, 1956 9 Sheets-Sheet 4

INVENTOR
ERNEST T. DALTON
BY
Louis L. Gagnon
ATTORNEY

April 19, 1960 E. T. DALTON 2,932,925
APPARATUS AND METHOD OF FORMING OPHTHALMIC LENSES
Original Filed Feb. 20, 1956 9 Sheets-Sheet 5
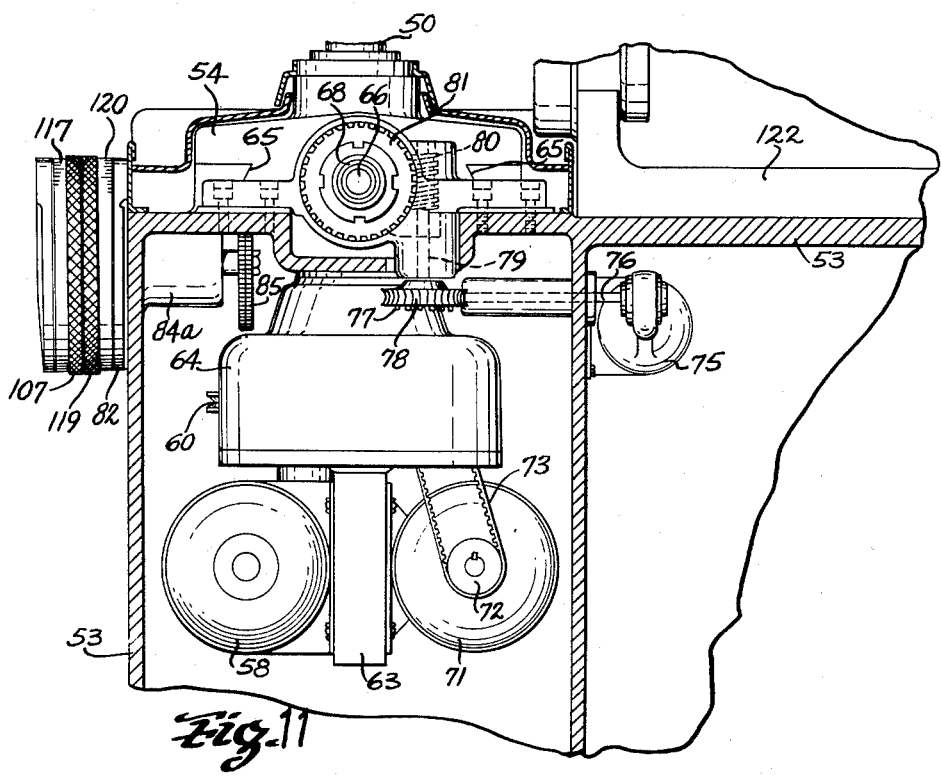
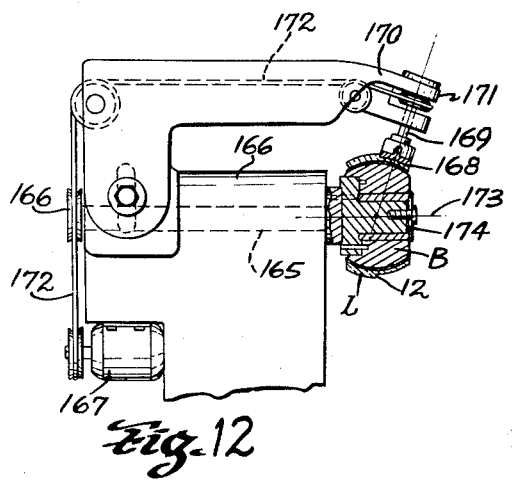
INVENTOR
ERNEST T. DALTON
BY
*Louis L. Gagnon*
ATTORNEY INVENTOR
ERNEST T. DALTON
BY Louis L. Gagnon
ATTORNEY April 19, 1960     E. T. DALTON     2,932,925
APPARATUS AND METHOD OF FORMING OPHTHALMIC LENSES
Original Filed Feb. 20, 1956     9 Sheets-Sheet 7

INVENTOR
ERNEST T. DALTON
BY
Louis A. Gagnon
ATTORNEY

INVENTOR
ERNEST T. DALTON
BY
Louis L. Gagnon
ATTORNEY

INVENTOR
ERNEST T. DALTON
BY
Louis L. Gagnon
ATTORNEY

United States Patent Office 2,932,925
Patented Apr. 19, 1960

2,932,925

APPARATUS AND METHOD OF FORMING OPHTHALMIC LENSES

Ernest T. Dalton, Sturbridge, Mass., assignor to American Optical Company, Southbridge, Mass., a voluntary association of Massachusetts Original application February 20, 1956, Serial No. 566,688, now Patent No. 2,890,551, dated June 16, 1959. Divided and this application March 16, 1959, Serial No. 799,659

9 Claims. (Cl. 51—131)

This invention relates to improvements in apparatus for forming multifocal lenses and has particular reference to the provision of novel means for simultaneously forming a plurality of one-piece multifocal lenses of the type having wide focal fields and a relatively straight line of division between said fields.

The instant application is a division of the inventor's co-pending application for patent Ser. No. 566,688 filed February 20, 1956 which issued as Patent No. 2,890,551, dated June 16, 1959.

In the manufacture of multifocal lenses, it has been found that by forming the desired focal fields upon a single piece of lens medium superior quality may be obtained since past difficulties of expansion, interfacial defects, chromatic aberrations, etc., commonly encountered in forming multifocal lenses of the fused type embodying two or more pieces of different glasses, are eliminated. However, prior processes of forming such one-piece multifocal lenses have required the use of relatively involved, complicated and expensive manufacturing techniques wherein each lens had to be formed individually. This not only restricted production, but increased cost and greatly restricted the marketing of such lenses.

It, therefore, is a principal object of the present invention to provide new and improved apparatus for producing a plurality of such one-piece multifocal lenses simultaneously with controlled optical characteristics and with the straight transversely extending line of division between the focal fields maintained at a practical minimum height.

Another object is to provide improved apparatus for forming lenses of the above character wherein the power introduced in the respective fields and the related optical centers thereof may be simply and accurately controlled.

Another object is to provide novel means for simultaneously generating a reading field of controlled power upon a portion of each of the optically finished distance fields of a plurality of lenses wherein said distance and reading fields will be divided by straight transversely extending lines of division passing substantially through the respective optical centers of said distance and reading fields.

Other objects and advantages of the invention will become apparent from the following description taken in conjunction with the accompanying drawings in which:

Fig. 4 is a top plan view of a lens generating device embodying the invention with portions of the protective coverings removed therefrom;

Fig. 5 is a sectional view of one of the cup-shaped abrading tools of said lens generating device;

Fig. 6 is a diagrammatic illustration of the rough generating of the lens blanks embodying my invention;

Fig. 7 is a view generally similar to Fig. 6 illustrating the fine generating of said lens blanks;

Fig. 11 is a fragmentary sectional view taken substantially on line 11—11 of Fig. 8 and looking in the direction of the arrows;

Fig. 12 is a diagrammatic illustration of a type of polishing apparatus to be used in connection with the embodiment of the invention;

Figure 1:
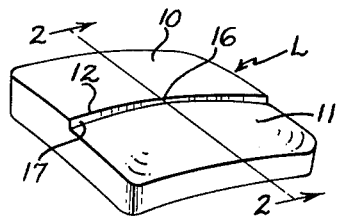
Fig. 1 is a perspective view of a lens blank formed in accordance with the invention.

Referring more particularly to the drawings wherein similar reference characters represent similar parts throughout the various views thereof, one form of a finished lens blank L embodying the invention is shown in Fig. 1 and comprises a single piece of lens medium, preferably optical crown glass or the like, having an upper or distance field 10 and a lower or reading field 11. The fields 10 and 11 are separated by a straight dividing line 12 which passes through the optical axis of the lens blank so as to provide said lens blank with a wide reading field 11 extending transversely throughout the width thereof.

Figure 2:
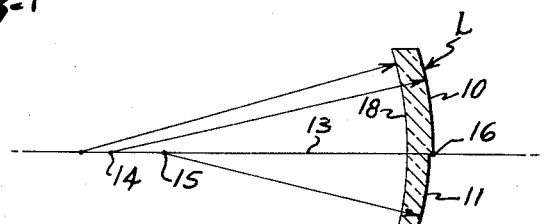
Fig. 2 is a sectional view of the lens blank taken on line 2—2 of Fig. 1 looking in the direction of the arrows and including a diagrammatic illustration of the centering of its different focal fields.

Referring more particularly to Fig. 2, wherein dot-dash line 13 represents the optical axis of the finished lens, it can be seen that the center of curvature 14 of the distance field 10 and the center of curvature 15 of the reading field 11 both lie on said axis line 13 and the optical centers 16 will, therefore, be in monaxial relation with each other and will lie on the dividing line 12 as illustrated in Figs. 1 and 2. Moreover, it is to be noted that the centers 14 and 15 of the curvatures of fields 10 and 11, respectively, are so positioned along the optical axis 13 as to provide a near mergence of said curvatures at said optical centers 16 and thus cause the dividing line 12 to be reduced to a practical minimum height adjacent said centers. This relation of the centers 16 substantially eliminates the error of "jump" when the line of vision of the eye passes from one field to the other. Dividing line 12, however, produces a ledge 17 which progressively increases in height toward the outer edges of the lens blank, which height on the opposed sides of the centers 16 is determined by the difference in curvatures of the fields 10 and 11.

The finished lens is formed by providing the opposed side of the lens blank with a finished optical surface 18 of a curvature which is such that when combined with the curvatures of the fields 10 and 11, it will give the required powers in said fields. The final thickness desired of the finished lens is controlled by the depth to which the surface 18 is formed.

In carrying out the simultaneous forming of a plurality of lens blanks of the above character in accordance with this invention, a plurality of lens blanks L (see Fig. 3), preferably of optical crown glass or the like, having on the convex sides thereof a continuous reference surface 10a substantially of the curvature desired for the distance portion of the finished lenses and all having substantially the same thickness and contour shape are provided. The reference surfaces 10a of the blanks may be optically finished or semifinished and in the latter case, they would be finally optically finished subsequent to the forming of the reading fields 11. The reference surfaces 10a are initially provided on the lens blanks by any one of the known standard methods of grinding and/or polishing which preferably incorporate the use of a multiple blocking arrangement for reasons of economy and the curvatures of the reference surfaces will be referred to hereinafter as the base curves of the lens blanks L.

It is to be understood that the term "multifocal" as used in this specification and accompanying claims is intended to mean lenses having two or more focal fields. However, in the description immediately following, the process of manufacturing lenses having only two focal fields, namely, a distance portion and a reading portion will be discussed. However, it will become apparent that lens blanks having more than two focal fields may also be manufactured with the use of the apparatus shown and described herein.

Figure 3:
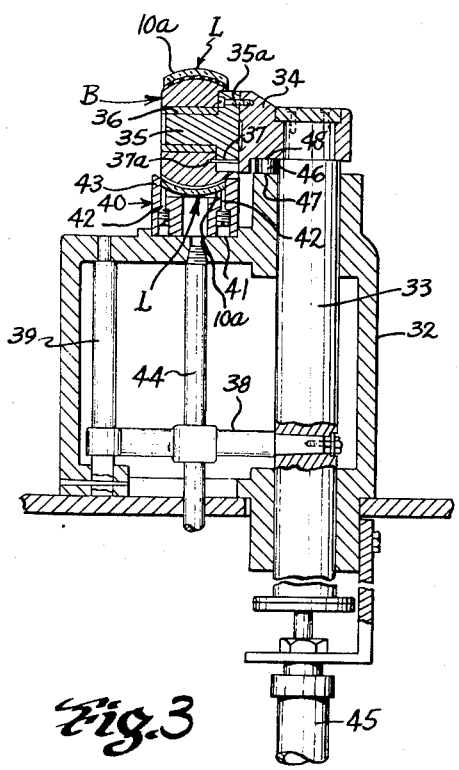
Fig. 3 is a side sectional view of a preferred type of lens blocking apparatus to be used with the embodiment of my invention.

The lens blanks L are first mounted upon the outer annular surface of a wheel-type block B by means of a precision blocking mechanism such as shown in Fig. 3 of the drawings.

The size of block B, however, must be selected in accordance with the particular surface curvature to be ultimately provided upon the reading field of the lens blanks which are mounted thereon. That is, the radial distance from the axis of rotation of the block to the lens blank mounting surfaces must be controlled in accordance with the desired radius of the curvature to be applied to the reading field so as to permit a relatively thin layer of pitch or suitable adhesive to be applied between the lens blanks L and said mounting surface of the block. However, in order to maintain a precise radial distance from the axis of rotation of the block to the ultimate reading portion surface 11 to be formed on the blanks L, which radial distance is equal to the radius of curvature of the reading portion curve, hereinafter referred to as the RP curve, precision spacer stops 46 specifically designed for each change in added power of the RP curves are used in conjunction with the blocking mechanism of Fig. 3. By so controlling the size of block B, the thickness of the above-mentioned pitch or adhesive between blanks L and the mounting surface of said block is maintained relatively thin and substantially constant throughout the range of the various sizes of blocks required for mounting blanks L. Any shrinkage of the pitch during its hardening would then be negligible and would not adversely affect the subsequent generating procedure.

The blocking mechanism of Fig. 3 comprises a base 32 having a vertically extending block carrying shaft 33 mounted for reciprocal movement therein. The upper end of shaft 33 is provided with a right-angled forwardly extending block supporting arm 34 rigidly secured thereto and having a reduced axle portion 35 of a diameter precisely controlled to intimately receive the hub portion 36 of the wheel-like block B. In addition, the axle portion 35 is rigidly mounted on arm 34 by studs 35a with its longitudinal axis normal to the longitudinal axis of shaft 33 and is provided with a locating pin 37 which is adapted to engage one of a plurality of matching orifices 37a in block B, when assembled therewith, to prevent rotation of said block relative to said axle portion 35 for purposes of indexing block B relative to the base 32 when applying lens blanks thereto as will be described immediately hereinafter.

In order to restrict shaft 33 from rotation and thus maintain axle portion 35 in a fixed transverse location relative to the base 32, a restraining arm 38 is secured at one end to shaft 33 and has its opposed end slidably mounted, in a vertical direction only, on a guide spindle 39 which, in turn, is rigidly secured in the base 32.

A removable blocking mould 40 generally square in shape is positioned in a recessed portion 41 of the base 32 and has its axis aligned with a line passing through the center of the width of the block B and intersecting the axis of the axle portion 35 at substantially right angles thereto and consequently similarly intersecting the axis of rotation of the block B when said block is placed on the axle 35. Mould 40 is provided with lens locating pins 42 of uniform length in each corner thereof for supporting a lens blank L when positioned therein with the general plane of its reference surface 10a in normal relation to the axis of the mould 40. The mould 40 is further provided with upwardly extending side portions 43 for engaging the edges of a lens blank L when placed therein and locating the geometrical center of said lens blank on said axis of the mould 40 whereby the axis of the curvature of the reference surface of said lens blank will intersect the axis of rotation of block B and be aligned substantially normal thereto.

It is pointed out that mould 40 may be of any desired shape such as to match that of the particular lens blanks to be fitted therein so as to intimately receive the side edges of said lens blank between the side portions 43 of the mould 40 and locate the geometrical center of the lens blanks substantially on the axis of the mould 40 at all times.

The blocking mechanism is further provided with a vacuum line 44 which is connected to the blocking mould recessed portion 41 for the purpose of setting up a vacuum of an amount to retain a lens blank properly seated on the pins 42. An air cylinder 45 or any other suitable motivating means is connected to the shaft 33 for the purpose of pneumatically moving the said shaft and the block B toward or away from the blocking mould 40.

Operation of the blocking mechanism is as follows:

Each of the lens blanks to be mounted on block B is provided with a suitable bonding agent upon the surfaces thereof opposed to the previously mentioned reference surfaces. In the case of the partciular process illustrated and described herein, the bonding agent would be applied to the concave surfaces of the blanks. Although various types of bonding agents and methods of applying same to the blanks may be used, it has been found preferable to place a pellet or wafer of pitch or the like on the concave surface of each of the lens blanks and, in turn, place said lens blanks in a suitable oven or heating chamber to controllably heat and soften the pitch. The blanks are then removed, one at a time, from the heating chamber and placed in the blocking mould 40 with the convex reference surface resting on pins 42 as shown in Fig. 3.

Attachment of a particular lens blank to the annular mounting surface of the block B is then accomplished by causing shaft 33 to be drawn downwardly upon proper actuation of air cylinder 45 whereupon the block will engage the softened pitch. However, since it is necessary to precisely control the radial distance from the axis of the block to the reference surface of the blank in accordance with the desired radius of curvature to be applied to the reading portion thereof, which radius will be equal to the desired radius of the RP curve, a removable spacer stop 46 of a precisely controlled thickness is placed upon a shouldered portion 47 of the base 32 adjacent the shaft 33 so as to be engaged by the under surface 48 of the arm 34 and thus limit the extent of downward movement of shaft 33 and so locate the axis of block B at a predetermined distance above the blocking mould 40.

Since each desired change in power of the RP curve requires a change in the radial distance from the axis of block B to the reference surface of the blanks mounted thereon, a particular spacer stop 46 of a controlled thickness is provided for each RP change within the range of powers which may be used with a particular block B.

It can then be seen that by controlling the distance from the tops of pins 42 in mould 40, upon which the reference surfaces of the lens blanks are seated, to the plane of shoulder 47 and by the proper selection of the thicknesses of spacer stop 46, the desired RP radius is obtained and the remaining space between the concave surface of the blanks and the mounting surface of block B will be filled by the pitch.

The vacuum line 44 is used to create a partial vacuum internally of mould 40 and thus retain a lens blank properly seated upon pins 42 during the blocking operation.

The above blocking operation is repeated by properly actuating air cylinder 45 and causing shaft 33 and block B to be raised, thus lifting the lens blank now attached thereto out of mould 40 since the adherence of the pitch is sufficient to overcome the holding force of the vacuum created internally of mould 40. Additional blanks are positioned one at a time in mould 40 in the above described manner and the block B is indexed to a clear position on the mounting surface thereof prior to each application by partially withdrawing block B from axle 35 an amount sufficient to clear the locating pin 37 and rotating said block B to a clear position on the mounting surface thereof which will be aligned with a second orifice 37a. The block B is then pushed inwardly upon axle 35, whereupon locating pin 37 will engage in said second orifice 37a to properly locate block B relative to mould 40 and the operation described above is repeated for each lens blank until the desired number of lens blanks are mounted upon the mounting surface of block B.

It is pointed out that the number of lens blanks which may be applied to a particular block is dependent upon the RP radius and also the outer contour size of the lens blanks to be applied thereto. Moreover, the lens blanks are preferably positioned in close edge-to-edge relation with each other about the lens block mounting surface and if the related sizes of the block and lens blanks are such as to leave a relatively wide spacing between the first and last lens blanks mounted thereon, it is also preferable to fill said space by similarly mounting a glass filler of substantially the same thickness as the lens blanks between said first and last mounted lens blanks. This provides a substantially continuous glass surface to be abraded and polished in the operations to follow and allows the abrading and polishing tools to pass over said space without sharply striking the edges of the adjacent lens blanks.

It is also pointed out that in order to maintain the above-mentioned distance from the top of pins 42 in mould 40 to the plane of shoulder 47 substantially constant, in connection with each change in block size, it is necessary to provide an individual mould 47 of the proper height and having proper length of pins to bring about this result. The block size is determined by the RP curve of the lens blanks to be processed thereon, as described hereinabove.

After having blocked the lens blanks in the above manner, the block B is then removed from the blocking device and the desired RP curve is generated upon the reference surfaces of the lens blanks in the following manner.

The block B and attached lens blanks L are secured on one end of and in axial alignment with a rotatable spindle 50 of the lens surface generating device, illustrated in Figs. 4, 8, 9, 10 and 11 of the drawings. Spindle 50 is initially positioned substantially midway between a pair of rotatable angled cup-shaped rough and fine, preferably diamond charged, abrading tools 51 and 52 respectively. Said tools are each adapted to be pivoted at points 51a and 52a respectively and angled with respect to spindle 50 so as to have their axes of rotation in a common plane with, and each intersecting the axis of the spindle 50. Furthermore, the pivot points 51a and 52a are each located at the lowest point on the cutting edge of the respective tools, and since it is desired that the dividing line 12 of the finished lens blanks L be formed to extend transversely through the ultimate location of the optical centers 16 therefore, the pivot point 52a of the fine or finish abrading tool 52 is positioned so as to lie in a horizontal plane passing through said ultimate location when block B is positioned upon spindle 50, as illustrated best in Fig. 8. Pivot point 51a, however, is positioned slightly above said horizontal plane preferably about 3/64 of an inch to cause the cutting edge of the coarse or rough abrading tool to initially rough form said dividing line 12 on lens blanks L slightly above the ultimate location of the optical centers 16 thereof.

This slightly raised condition of tool 51 is provided to protect the immediate area in which the dividing line 12 is to be finally formed by tool 52 from damage due to possible glass flaking which might be caused by the coarseness of the abrading particles of tool 51. It is pointed out that the tool 51 is only used to form the general shape of the final RP curve as will become apparent from the description to follow.

Tools 51 and 52 are preferably provided with a controlled diameter D and a formed radius of curvature R, Fig. 5, upon the cutting edges thereof, radius R being equal to the radius of curvature of the RP curve to be generated on blanks L. A particular pair of tools 51 and 52 is provided for each desired change in RP curvature and the radius R of said tools is designed to cause a true continuous RP curvature to be generated from the ledge 17 of blanks L to the outer edges thereof when the tools are properly angled with respect to the axis of spindle 50.

It should be understood that cup-shaped tools similar to the tools 51 and 52 but having sharp or knife-like abrading edges may be used in place of the preformed tools 51 and 52 if desired. However, wear upon the sharp abrading edges of such tools tends to produce inferior abraded surfaces or cliff-like dividing lines 12 on the lens blanks and it has been found that the above described preformed tools 51 and 52 produce the best results.

The extent to which tools 51 and 52 are angled with respect to the axis of spindle 50 is geometrically determined by the ultimate RP curve desired to be generated upon the blanks L. That is, for example, if it is desired to provide the blanks L with an RP curve of a 76.335 mm. radius, the tools 51 and 52 selected would have a cutting edge diameter of 3.125 inches, a radius R of 76.335 mm. and the rough abrading tool 51 would be set at an angle of 32°13′ from the axis of spindle 50, whereas the fine abrading tool 52 would be set at an angle of 31°19′ from the axis of spindle 50. However, if it is desired to provide blanks L with an RP curve of a 66.769 mm. radius, the tools 51 and 52 would be selected to have a diameter D of 3.125 inches, a radius R 66.769 mm. and tool 51 would be angled to 37°29′ whereas tool 52 would be angled to 36°28′, etc.

It is pointed out that the tool dimensions and angular settings are precisely calculated for each RP curvature required by the optical profession and that three major factors are necessary to generate the desired RP curve on the lens blanks L. These factors are: first, blocking the blanks to provide a predetermined radial distance from the axis of rotation of the block to the surfaces of the blanks; second, selecting tools having the proper cutting edge diameters D and radii R and, third, properly angling each of the abrading tools with respect to the axis of rotation of the block so as to generate in the transverse meridian of the blanks a radius of curvature which is substantially equal to the radius of curvature generated in a meridian normal thereto and resulting from the rotation of said blanks about the axis of the block. This is to cause said RP surfaces to be spherical in power.

By referring to "the diameter of the cutting edge of the abrading tools," it is intended to mean the diameter D, Fig. 5, measured at the apex of the leading abrading edge portion thereof.

The RP curve is then generated on the lens blanks L by causing the rotating spindle 50 and blocked lens blanks L attached thereto to be moved transversely in the above-described common plane with the axes of rotation of the abrading tools, so as to first engage the rough abrading tool 51 whereupon the abrading action of the tool 51, due to its rotation and the rotation of lens blanks L about the axis of block B, will cause the straight line of division 12 and the ledge 17 to be formed simultaneously with the forming of the RP curve which curve is controlled by the shape and angle of the tool and the radial distance from the axis of block B to the surfaces of blanks L. Said transverse movement is continued until the desired depth of cut is obtained. Since the tool 51 is of a coarse or rough abrading type which is used to form only the general shape of the ultimate RP curve for purposes of expediting the generating operation, the rotating spindle 50 is next caused to retract from tool 51 and is moved in the opposite direction along said common plane an amount sufficient to cause the blanks L to engage the tool 52 which is, in turn, the fine or finish abrading tool. Spindle 50 is caused to continue its transverse movement in the direction of tool 52 until a predetermined desired depth of finish cut is accomplished. In the case where the reference surfaces 10a of the lens blanks are initially optically finished to the precise curvatures desired of the distance fields 10 of the lens blanks, the depth of cut is controlled to cause the newly generated RP curvatures to nearly merge with the finished reference surfaces 10a at the ultimate location of the optical centers 16 of each of the finished lenses. However, if the reference surfaces 10a are initially semifinished, the depth of cut is controlled to be deeper and cause a slight shoulder to be left on the dividing line 12 at the location of the optical center 16 of the finished lenses and in subsequently optically finishing the distance fields 10, the slight shoulder is reduced to a practical minimum. When the lens blanks have been abraded by tool 52 to a desired depth of cut, the spindle 50 is caused to retract from tool 52 and assume its initial position between tools 51 and 52. It will be noted that due to the relative vertical positions of the tools 51 and 52 and the blocked blanks L, that approximately one-half of the side area of each of the blanks L is provided with the RP curve and the remaining half has the untouched reference surface 10a thereon. This reference surface ultimately becomes the distance viewing portion of the finished lens.

Referring more particularly to Figs. 6 and 7 which diagrammatically illustrate the forming of the ledge 17 on lens blanks L during the generation of the reading portion 11, it will be noted in Fig. 7 that the ledge 17 is finally finished to have its surface lie in the plane of the optical axis 13 of the lens blanks L which plane is also coincident with the pivot point 52a of the abrading tool 52.

Since it is preferred to have the plane of the surface of ledge 17 substantially coincident with said plane of the optical axis 13 of the lens blanks L so as to prevent the undesired effects of prism displacement when the line of vision of the wearer's eye passes over ledge 17 while shifting from one focal field to another, the abrading edge portions of tools 51 and 52 are formed to controlled angular shapes for each change in RP curve to be generated. That is, a different set of tools 51 and 52 each having a proper angularly shaped cutting edge portion is selected in accordance with the degree of tilt required to produce the desired RP curve and the said angle in each instance is such as to cause the resultant cliff edge 17 of the dividing line 12 to be formed in a plane substantially parallel with the axis 13 and lying on said axis.

It will be noted in the previously described examples of the angular settings of tools 51 and 52 that the angular setting of the rough abrading tool 51 for each particular RP curve is approximately one degree greater than that of the fine or finish abrading tool. This increased tilting of tool 51 about point 51a, in effect geometrically causes the rough RP curve to be formed at substantially the same radius of curvature as the fine RP curve which is generated by tool 52 regardless of the above-mentioned slightly raised condition of tool 51 which prevents possible slight flaking of the glass from reaching and damaging the ultimate dividing line 12 of the lens blanks L.

As described hereinbefore, the tool 51 is used to form only the general shape of the RP curve and ledge 17.

Figure 8:
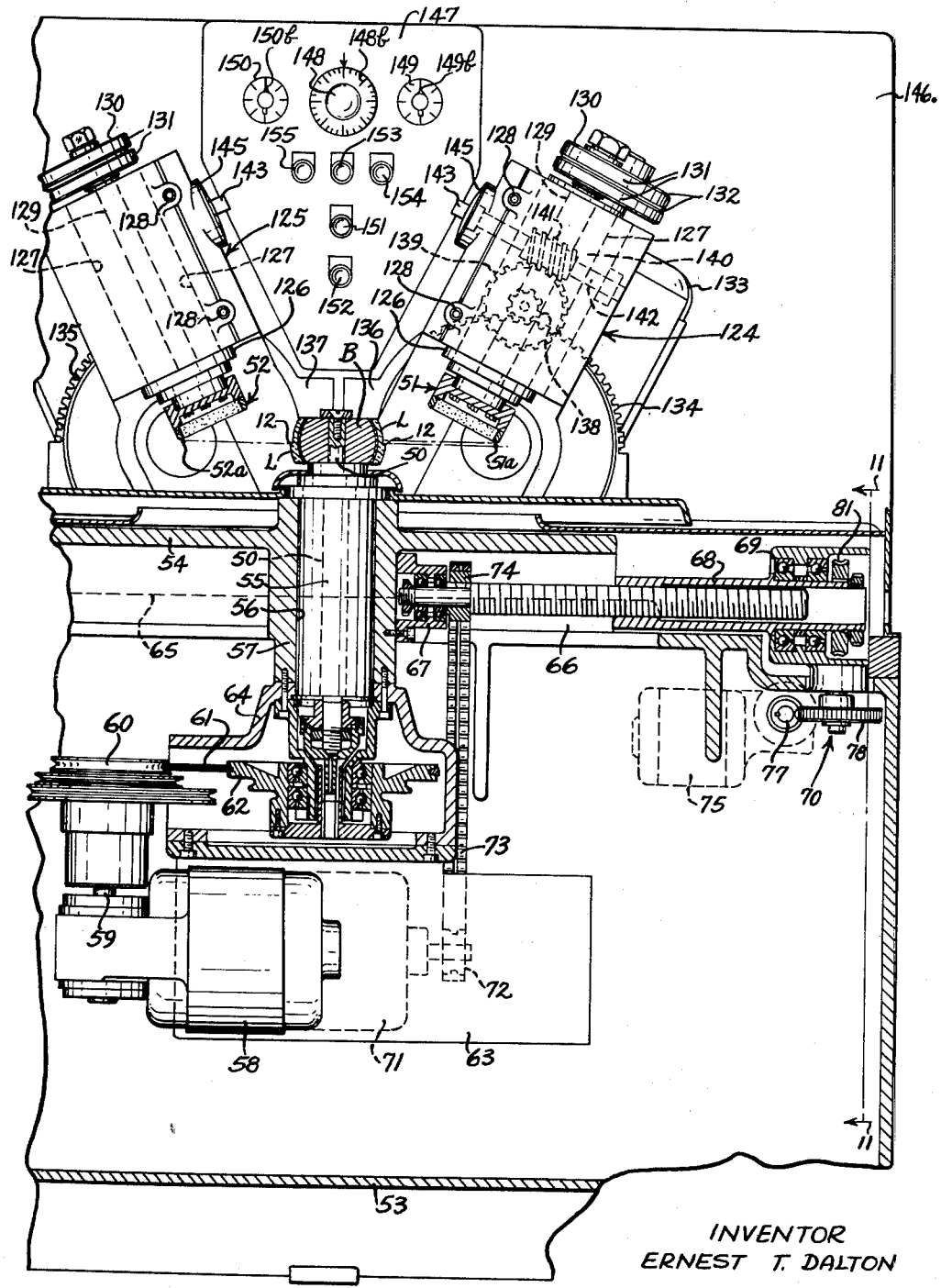
Fig. 8 is a fragmentary sectional view taken substantially on line 8—8 of Fig. 4 and looking in the direction of the arrows.

The finish abrading tool 52, Fig. 8, is so angled as to cause the plane of the ledge 17 to be properly formed substantially coincident with the plane of axis 13 since the fine grain of the abrading particles therein produce substantially no flaking of the glass and provides a clean cut line of division 12 between the adjacent fields 10 and 11.

Figure 9:
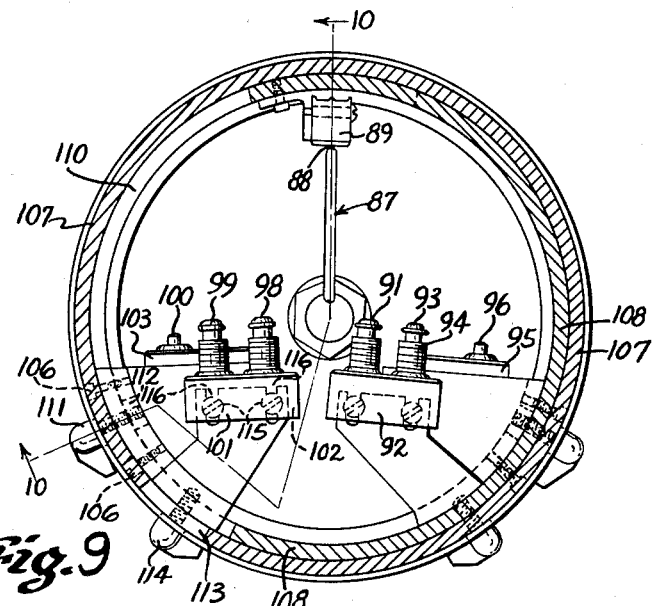
Fig. 9 is an enlarged sectional view taken on line 9—9 of Fig. 4 and looking in the direction of the arrows.

It is particularly pointed out that due to the fact that the lowermost ends or apices of the cutting edges of the tools are located on the axis of the pivots 51a and 52a, as shown particularly in Figs. 7, 8, and 9, no shifting of the position of said lowermost ends or apices with respect to said axes takes place during the angling of the tool.

The block B is next removed from spindle 50 and the final finishing of the generated RP curvatures is accomplished by a polishing operation to be described hereinafter.

The above-described generating procedure, however, is automatically performed by the generating device of Figs. 4, 8, 9, 10 and 11 wherein said device comprises in addition to tools 51 and 52 and spindle 50, a base 53 having a transversely slidable table 54 mounted on the upper surface thereof. Spindle 50 is journaled in a vertically extending housing 55 which, in turn, is rigidly secured in the longitudinal bore 56 of an enlarged depending supporting portion 57 of table 54. Rotation of spindle 50 is accomplished by means of a drive motor 58 which is coupled to the lower end of said spindle 50 by a drive shaft 59 having a pulley 60 mounted thereon and a connecting belt 61 engaging a second pulley 62 which, in turn, is splined to shaft 50. Said spindle drive mechanism is rigidly secured to and movable with table 54 by means of a combined motor bracket 63 and pulley housing 64 which housing is bolted or otherwise secured to the underside of the spindle supporting portion 57 of table 54.

In order to move the table 54 transversely along the top of base 53 which path of movement is in the common plane of the axes of the spindle 50 and of the tools 51 and 52 and is guided by suitable tracks or guideways 65, one at each side thereof, Figs. 8 and 11, a lead screw 66 is rotatably secured at one end thereof by a bearing support 67 to the spindle supporting portion 57 of table 54 and the opposed end of said lead screw 66 is threadedly engaged in a sleeve 68. Sleeve 68 is, in turn, mounted for rotation in a stationary housing 69 rigidly secured to the base 53.

As described hereinabove, the spindle 50, carrying block B, is to be moved first into engagement with tool 51 and secondly into engagement with tool 52 and returned to its initial position substantially midway therebetween to effect the desired generating procedure. However, it is a well-known fact in the trade that during a lens cutting or generating operation, the lenses must be fed relatively slowly into an abrading tool in order to prevent undue flaking of the glass or damage thereto. For this reason, the sleeve 68 is powered for rotation in either direction by a controllable slow speed drive unit 70. However, in order to expedite the movement of lenses L on block B throughout their course of travel between their points of engagement with tools 51 and 52, lead screw 66 is powered for rotation in either direction by a high speed drive mechanism embodying a high-speed reversible motor 71 having a sprocket 72 on its shaft. A chain belt 73 is positioned upon sprocket 72 and extends upwardly and over a second similarly shaped sprocket 74 which is keyed to lead screw 66. With the sleeve 68 held stationary in housing 69, rotation of motor 71 in one direction will, through sprockets 72 and 74 and chain belt 73, cause the lead screw 66 to rotate and advance into sleeve 68 thus drawing table 54 towards tool 51 whereas rotation of motor 71 in the opposed direction will cause lead screw 66 to retract from sleeve 68 and move table 54 in the opposed direction.

The slow-speed drive, however, is powered by a reversible motor 75 which is geared to a horizontal shaft 76 having a worm gear 77 at its opposed end engaging a worm follower 78 on a second shaft 79 extending vertically to a second worm gear 80, Figs. 8 and 11. Worm gear 80 then engages a second worm follower 81 which is keyed to sleeve 68 whereby rotation of motor 75 will, through the above gears and shafts, cause sleeve 68 to be rotated in housing 69.

In operation, motor 75 is initially de-energized which, due to the inherent braking effect of the worm gears and worm followers, prevents sleeve 68 from rotating in housing 69 thus allowing motor 71 to be energized so as to rotate in the proper direction to operate lead screw 66, as described above, and rapidly move table 54 to bring the blanks L to a point spaced a short distance from the tool 51 whereupon motor 71 will be de-energized and stopped. Motor 71 is preferably of a type embodying a conventional spring set magnetic braking means which functions to brake and stop the rotation thereof when said motor is de-energized. By said braking effect, lead screw 66 will be held stationary. Motor 75 is then energized to rotate at a given maximum speed which is considerably slower than speed of motor 71 and, in turn, rotate sleeve 68 and cause lead screw 66 to be drawn inwardly thereof which will cause table 54 to continue its movement at a slower rate towards tool 51. Upon reaching a point immediately prior to the engagement of lens blanks L with tool 51, the motor 75 is electrically controlled to cause table 54 to continue its movement toward tool 51 at a predetermined slower generating speed.

The purpose of including the first-mentioned slow speed of motor 75 is to provide a progressive slowing down of the table 54 from the rapid speed of motor 71 to an ultimate still slower generating speed. This still slower speed is brought about by an electrical variac in the circuit of motor 75 and thus prevents any possible overtravel of motor 71, during its braking period, from causing lens blanks L to engage tool 51 at a speed faster than the desired predetermined slow speed. The automatic electrical means, Fig. 13, for controlling the above motors will be discussed hereinafter. When the desired depth of cut is reached on blanks L at said slow speed, motor 75 is then de-energized and consequently again restricts sleeve 68 from rotation whereupon re-energization of motor 71 in a reverse direction to that previously mentioned will cause lead screw 66 to rapidly withdraw from sleeve 68 and move table 54 towards tool 52. The operation of the two feed mechanisms would be repeated in a similar manner for the fine generating of blanks L and the return of table 54 to its starting position at which time both feed motors as well as spindle drive motor 58 would be de-energized to permit removal of block B from spindle 50.

Figure 10:
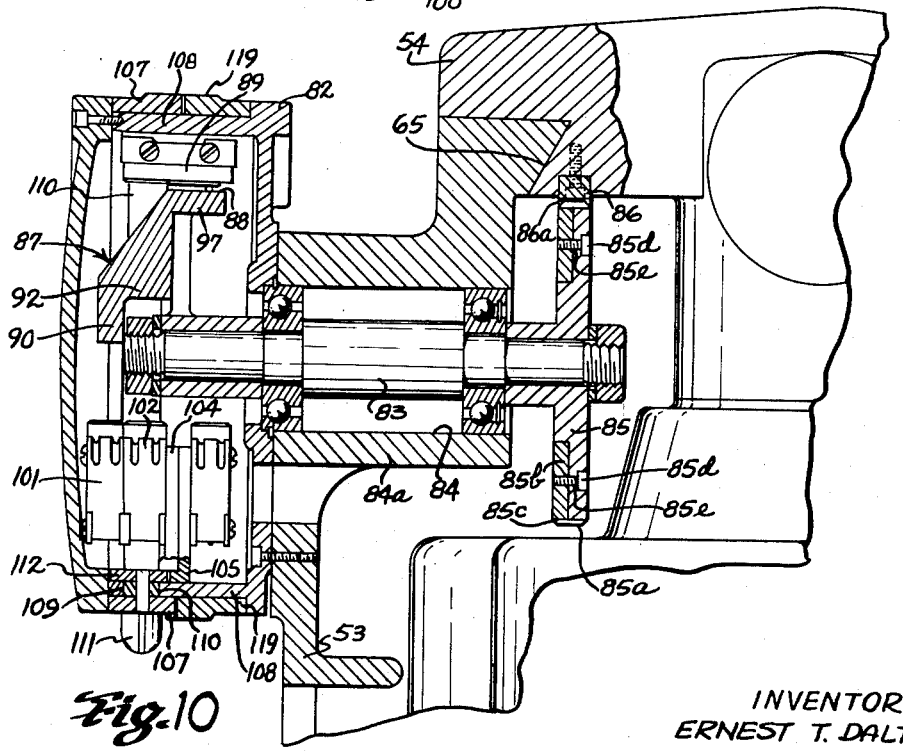
Fig. 10 is a fragmentary sectional view taken on line 10—10 of Fig. 9 looking in the direction of the arrows.

A control mechanism, Figs. 9 and 10, for automatically controlling the operation of motors 58, 71 and 75 is rigidly secured on the forward upper surface of base 53 and comprises a circular housing 82 into which one end of a shaft 83 projects. Shaft 83 is journaled in a rearwardly extending bore 84 of a protuberance 84a formed in the base 53. The opposed end of said shaft 83 is provided with a pinion 85 which, in turn, engages a rack 86 secured to the underside of table 54. Movement of table 54 will then cause rack 86 to rotate pinion 85 and consequently shaft 83.

In order to provide an intimate fit between the teeth 85a of the pinion 85 and the teeth 86a of the rack 86 so as to eliminate the effect of backlash and insure an accurate registry of the movement of table 54 by the extent of rotation of shaft 83, the pinion 85 is provided with an adjustable annular segment portion 85b which is, in turn, provided with teeth 85c of substantially the same shape and pitch as teeth 85a. Segment 85b is clamped to pinion 85 by studs 85d which extend through slotted openings 85e therein. Upon assembling rack 86 and pinion 85, the above-mentioned backlash inherent in conventional rack and pinion drives is eliminated by clamping segment 85b in a slightly rotated position relative to the body portion of pinion 85 so as to cause the leading surfaces of teeth 85a to engage one side of the adjacent teeth 86a of rack 86 and the trailing surfaces of the matching teeth 85c to simultaneously engage the opposed sides of teeth 86a of rack 86 whereby each of the combined teeth 85a and 85c will, upon meshing with rack 86, completely fill and intimately engage both sides of the adjacent spacing between teeth 86a of said rack.

The end of shaft 83 which projects into housing 82 is provided with a paddle-like switch actuating cam 87, rigidly secured thereon, which is adapted to alternately engage a plurality of electrical switches upon rotation of shaft 83.

Said cam 87 is so aligned on shaft 83 as to be in a vertical or neutral position, as shown in Figs. 9 and 10, when the table 54 is in its initial starting position with block B substantially midway between tools 51 and 52, as shown in Figs. 4, and 8. When in said neutral position, the uppermost edge 88 thereof is in engaged relation with an electrical switch 89 which is rigidly secured to housing 82. Switch 89 functions to de-energize motors 58, 71 and 75 upon completion of a generating operation as will be described in detail hereinafter.

Movement of table 54 in a direction toward tool 51 by energizing motor 71 will then cause shaft 83 to rotate cam 87 in a clockwise direction, as viewed in Fig. 10, whereupon the lower portion 90 thereof, Fig. 11, will subsequently engage the plunger 91 of an electrical switch 92 which is adjustably mounted on housing 82. Switch 92 then functions to de-energize motor 71 and energize motor 75 at a point just prior to the engagement of lens blanks L with tool 51, so as to cause motor 75 to operate at its first-mentioned slow speed until blanks L reach a point immediately prior to engaging tool 51.

Figure 13:
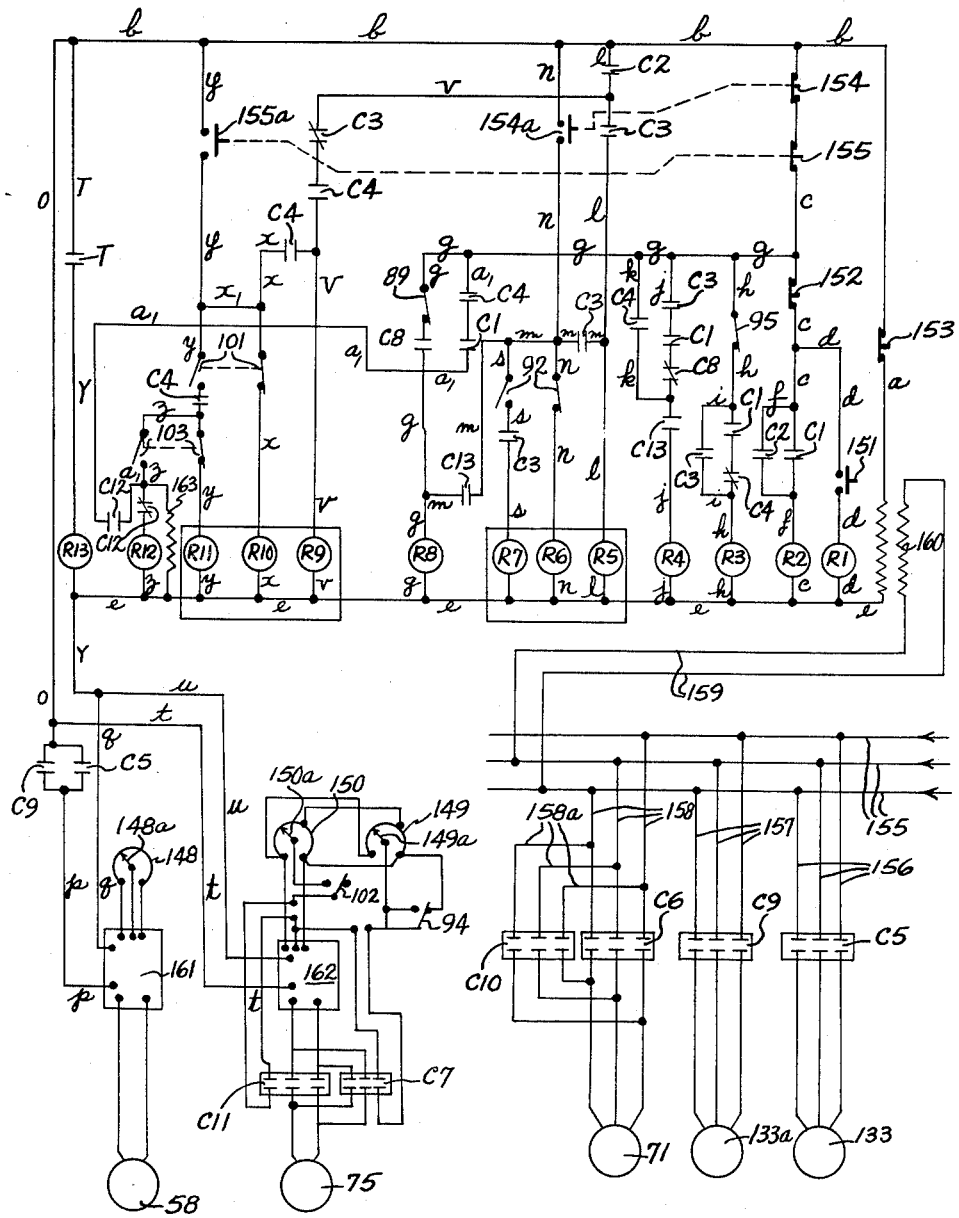
Fig. 13 is a schematic illustration of the electrical circuit for automatically controlling the operation of the above lens blank generating device.

Cam 87 meanwhile has continued to rotate and at the instant before blanks L engage tool 51, the area 92 of cam 87, Fig. 10, will engage plunger 93 of a second electrical switch 94 which switch, in turn, functions through the electrical control means of Fig. 13 to cause motor 75 to operate at its ultimate still slower speed throughout the cycle of the rough abrading of the RP curve on blanks L. Upon reaching the desired depth of cut, which is limited by adjustably positioning a third electrical switch 95 having a plunger 96 upon housing 82, the upper side surface 97 of cam 87 will then engage plunger 96 and cause switch 95 to function to de-energize motor 75 and energize motor 71 in a reverse direction to its initial starting direction of rotation and thereby cause table 54 to retract from tool 51 and proceed at a fast speed towards tool 52, as described hereinabove.

Said movement of table 54 towards tool 52 will then cause cam 87 to rotate in a counterclockwise direction, as viewed in Fig. 9, until it contacts the plungers 98, 99 and 100 of switches 101, 102 and 103, respectively, which function to control motors 71 and 75 through the circuits of Fig. 13 in a manner identical to that of switches 92, 94 and 95. Upon finally contacting plunger 100 of switch 103, cam 87 and table 54 are returned to their initial starting position by again electrically reversing the direction of rotation of the fast-speed motor 71. Upon reaching its neutral position, the upper edge surface of cam 87 engages switch 89 which, in turn, de-energizes both motors 71 and 75 and motor 58 to permit removal of block B from spindle 50.

As previously mentioned, switches 92, 94, 95, 101, 102 and 103 are adjustably mounted within housing 82 to permit the location of the upper ends of the respective plunger portions 91, 93, 96, 98, 99 and 100 to be so positioned relative to each other and to the cam 87 as to properly control the extent of movement, speeds and directions of travel of table 54. By referring to one of the two groups of three switches, namely, 101, 102 and 103, it can be seen from Figs. 9 and 10 that this positioning is accomplished by mounting switches 101 and 102 upon a bracket 104 and switch 95 upon a similar shaped bracket 105. Bracket 105 is rigidly attached by means of studs 106 to an outer adjusting ring 107 rotatably mounted on an annular forwardly extending shouldered portion 108 of housing 82. Said studs 106 extend through ring 107 and are threadedly engaged in an integrally formed slide portion 109, Fig. 10, of the bracket 105 which is slidably fitted in a guide slot 110 of the shouldered portion 108. Rotation of ring 107 will then cause bracket 105 and switch 103 to rotate in unison and in order to retain said bracket in a desired adjusted position relative to cam 87, a clamp screw 111 is provided which extends through ring 107, slide portion 109 and threadedly engages a gib 112, Fig. 11, which upon tightening of clamp screw 111 will engage the inner surfaces of shoulder 108.

Since it is necessary to adjust bracket 104 and attached switches 101 and 102 relative to switch 103 for positioning the plunger 99 in proper relation with plunger 100 to determine the depth of cut in blanks, which depth is controlled by the extent of travel of cam 87 between plungers 99 and 100, bracket 104 is constructed similar to bracket 105 in that a slide portion 113, Fig. 10, is fitted into slot 110. However, bracket 104 is retained in its desired adjusted position on ring 107 solely by means of a clamp screw 114. Loosening of clamp screw 114 will permit bracket 104 to be slidably adjusted along ring 107.

Switches 101 and 102 may also be adjusted relative to each other upon bracket 104 by loosening screws 115 which may be moved in slots 116 of said bracket.

By properly adjusting switches 101, 102 and 103 and tightening screws 115 and 114, said switches may then be moved as a unit by loosening lock screw 111 and rotating ring 107 to a desired position relative to the neutral position of cam 87 and said movement is recorded by suitable indicia 117 provided on the outer surface of ring 107 to be matched with an indicating mark 118 on the stationary portion of housing 82. Said indicia is graduated to record the settings used to provide the desired RP curves on lens blanks mounted on various sized blocks B.

The above described switches 101, 102 and 103 in combination with the electrical circuits of Fig. 13 control the operation of table 54 in conjunction with the fine or finish abrading operation and switches 92, 94 and 95 are used to control the rough abrading operation in an identical manner and are also identically constructed and assembled for rotation with a second rotatable ring 119 positioned in side-by-side relation with ring 107 on shoulder 108 and having indicia 120 on the outer surface thereof to be aligned with an indicating mark 121.

The abrading tools 51 and 52 are each located upon the generating device by means of supporting brackets 122 and 123, which are bolted or otherwise secured to the upper surface of base 53 thereof, Figs. 4, 8 and 11. Each of said brackets are provided with spindle heads 124 and 125, respectively, which are pivotally mounted thereon at 51a and 52a in overhanging relation with the movable table 54. Said heads are each identically constructed and each comprises a spindle housing 126 fitted in a longitudinal bore 127 extending through the forward portion thereof, said spindle housing being clamped in said bore 127 by locking studs 128. A spindle 129 in each of heads 124 and 125 carrying an abrading tool at one end is journaled in housings 126 and is provided with pulleys 130 at the opposed ends which, in turn are connected by belts 131 to additional pulleys 132 on the drive spindles of motors 133 and 133a mounted rearwardly of heads 124 and 125 respectively.

Radial racks 134 and 135 are provided upon each of the upstanding forward portions 136 and 137 of the respective brackets 122 and 123 each having their centers of curvatures located at pivot points 51a and 52a, respectively.

A drive arrangement for tilting the head 124 about pivot point 51a is illustrated on head 124 of Fig. 8 and it is to be understood that head 125 is identically constructed. Said drive arrangement embodies a pinion 138 in engaged relation with rack 134 and mounted for rotation in head 124. A worm follower 139 is mounted for axial rotation with pinion 138 and is positioned internally of a cavity 140, Figs. 4 and 8, formed in head 124. Said worm follower 139 is, in turn, engaged by a worm gear 141 which is secured to and rotatable with a transversely extending shaft 142 journaled in said head 124 and having an outwardly extending irregularly shaped end portion 143 to which a wrench or suitable handle may be detachably applied when angularly adjusting head 124. Rotation of shaft 142 will, through worm gear 141 and worm follower 139, cause pinion 138 to move along rack 134 and tilt head 124 about pivot point 51a. The angle of tilt is recorded by suitable indicia 144 provided upon an indicating plate 145 fixed for rotation upon the outwardly extending portion 143 of shaft 142.

The electrical circuit, Fig. 13, for controlling the above-described automatic operation of the generating device functions as follows:

The symbols R1 through R13 schematically represent electrical relays which electromagnetically function to close or open contacts C1 through C13 which are placed in the various lines of the circuit. Said contacts are each represented by a pair of short parallel lines illustrating a break or normally open circuit in its respective line. However, the contacts having a diagonal line shown therethrough, each illustrate a normally closed circuit in their respective line and when activated by a related relay, function to open or break the circuit.

The apparatus embodying the electrical equipment schematically illustrated in Fig. 13 is housed within an upstanding enclosure 146 attached to the rear portion of the generating device, as shown in Fig. 8, and a control panel 147 extends forwardly and centrally from said enclosure so as to be easily accessible.

Control panel 147 includes a conventional variac 148 for selectively controlling the speed of the work spindle motor 58 and a pair of conventional variacs 149 and 150 for similarly controlling the speed of slow-feed motor 75 wherein variac 149 is used to control the rate of feed for rough generating and variac 150 controls the rate of feed for the fine or finish generating. Said variacs are each provided with movable rotor arms 148a, 149a, and 150a, Fig. 13, which are operated by indicating dials 148b, 149b and 150b respectively, Fig. 8. Push button switch 151 is used to start the generating cycle and push button 152 is used to stop the generating cycle whereas push button 153 is used to de-energize the complete control circuit including the work spindle motor 58 and the slow-feed motor 75 for emergency purposes. Push button 154 is used to jog motor 71 to the right and push button 155 is used to jog said motor to the left.

Said variacs and push buttons and motors are designated in Fig. 13 by like reference numerals and the control switches 89, 92, 94, 95, 101, 102 and 103 of Figs. 10 and 11 are also designated in Fig. 13 by like reference numerals.

It is pointed out that the contacts and switches of Fig. 13 are illustrated as being in the starting position. That is, all motors are de-energized and the work-carrying spindle 50 of table 54 is located centrally between tools 51 and 52 prior to a generating operation, as described above.

Current is initially fed to the electrical system by an alternating current three-phase circuit 155 from which leads 156, 157, and 158 are connected to operate motors 133, 133a and 71. Leads 159 are, in turn, connected to one pair of wires of said three-phase circuit to provide reduced alternating voltage to the primary windings of a conventional 1 to 1 ratio transformer 160 which then acts through its secondary windings to provide a low-voltage supply for operation of the remaining portion of the illustrated circuit.

The generating cycle is started by depressing push button 151 which acts to energize relays R1, R2, R3, and R4 in succession and simultaneously operate contacts C1, C2, C3, and C4. This is accomplished by supplying a flow of current from one side of transformer 160 through lead a, normally closed push button 153, lead b, lead c which includes normally closed push buttons 154, 155 and 152, lead d, push button 151, R1, lead e and to the opposed side of transformer 160. R1 then acts to operate all contacts C1 whereupon current will then flow from transformer 160, through lead a, push button 153, lead b, lead c, push buttons 154, 155, 152, C1, R2, lead e and to transformer 160. R2 being thus energized, all contacts C2 will operate whereupon R2 will be held energized through bypass leads f and C2. R3 is energized through a circuit from transformer 160, lead a, lead b, lead c and push buttons 154 and 155, lead g, lead h, closed switch 95, C1 which was closed by R1, normally closed C4, R3 and lead e to transformer 160. R3 will be held energized by bypass lead i and closed contact C3. R4 is energized through a circuit from transformer 160, lead a, lead b, lead c and push buttons 154 and 155, lead g, lead j including now closed contacts C3 and C1 and normally closed contacts C8 and C13, R4, lead e to transformer 160. R4 will be held energized by bypass lead k including now closed contact C4.

Upon releasing push button 151, R1 will again be de-energized and all contacts C1 will return to their initial open condition.

With R2, R3 and R4 energized and their associated contacts C2, C3 and C4 operating as described above, relays R5, and R6 will be simultaneously energized through the following circuits:

R5 is energized through a circuit from transformer 160, lead a, lead b, lead l which includes now closed contacts C2 and C3, R5 and lead e to transformer 160.

R6 is energized through a circuit from transformer 160, lead a, lead b, lead l including now closed contacts C2 and C3, lead m including now closed contact C3, lead n including switch 92 having one side normally closed and R6 and lead e to transformer 160.

With relays R5 and R6 now energized, their associated contacts C5 and C6 will now operate to energize the rough grind tool motor 133 and the fast-feed motor 71 to rotate in a direction suitable to drive table 54 and spindle 50 rapidly toward the rough grind tool 51 and also energize the work-spindle motor 58.

Motor 133 is energized by the closing of its contacts C5 to complete a circuit from lines 155 through leads 156.

Motor 71 is energized by the closing of its contacts C6 to complete a circuit from lines 155 through lines 158.

Motor 58 is energized through a circuit from transformer 160, lead a, lead b, lead o, now closed contact C5, and lead p which enters a conventional direct current rectifier and control unit 161 embodying the speed control variac 148, which unit converts the alternating current supplied thereto into direct current to operate the conventional direct current motor 58. The circuit then returns from unit 161 to transformer 160 through lead q, lead r and lead e.

With the table 54 of the generating device thus rapidly moving towards tool 51, the switch actuating cam 87, Figs. 10 and 11, ultimately approaches and activates switch 92 at a predetermined point spaced a given distance from the tool 51, as previously described.

Switch 92, being of a double contact type as schematically illustrated in Fig. 13 causes the circuit in line n to be opened by one set of its contacts and, consequently, relay R6 to be de-energized and its associated contacts C6 to return to their initial open position which opens the circuit through leads 158 to stop the fast-feed motor 71. However, the other set of contacts in switch 92 simultaneously closes a circuit to energize relay R7. Said circuit from transformer 160 passes through lead a, lead b, lead l which includes now closed contacts C2 and C3, lead m which includes now closed C3, lead s which includes the now closed portion of switch 92 and closed C3, R7 and lead e back to transformer 160.

By so energizing R7, its associated contacts C7 are closed to provide a closed circuit to energize the slow-speed drive motor 75. Said circuit passes from transformer 160 through lead a, lead b, lead o, lead t to a conventional direct current rectifier and control unit 162 which is similar in character to unit 161 and embodies a pair of variacs 149 and 150 for controlling the speed of motor 75. The circuit returns to transformer 160 through leads u, r and e. Variac 149 controls the motor speed for rough generating and variac 150 controls the motor speed for fine generating.

It will be noted that the closing of contacts C7 will connect the variac 149 in circuit with the unit 162 and motor 75. However at this time, with switch 94 in the position illustrated, the rotor arm 149a of variac 149 is bypassed and thus causes motor 75 to operate at its initial slow speed until table 54 and blanks L reach a point spaced a given distance from the tool 51 whereupon cam 87, Figs. 9 and 10, will function as described previously to actuate switch 94 which, in turn, will cause the variac rotor arm 149a to be connected in the variac circuits to unit 162 and enable the still further reduction of the speed of motor 75 in a conventional manner in accordance with the selected positioning of said arm by manipulation of the dial 149b at the control panel 147, Fig. 8. Variac 150 is, of course, disconnected from the circuit to motor 75 since contacts C11 are open.

With the lens blanks L now advancing into tool 51 at said further reduced slow speed, the above-mentioned cam 87 will next activate switch 95 at the point where the desired depth of cut on lens blanks L is achieved.

Upon activating switch 95, the circuit in line h is opened and, consequently, R3 is de-energized. This, in turn, returns all contacts C3 to their initial open or closed position. By so doing, relay R7 is de-energized which opens contacts C7 on slow-speed motor 75 to stop same and disconnect variac 149 from the control unit 162 and motor 75. Simultaneously, relays R9 and R10 are energized through the following circuits:

R9 is energized through a circuit from transformer 160, through lead a, lead b, lead l which includes now closed C2, lead v which includes normally closed C3 and now closed C4, R9, and lead e to transformer 160.

R10 is energized through a circuit from transformer 160 through lead a, lead b, lead l which includes now closed C2, lead v which includes normally closed C3 and now closed C4, lead x which includes now closed C4 and the normally closed portion of switch 101, R10, and lead e to transformer 160.

By thus energizing R9 and R10, contacts C9 and C10 are closed and the work-spindle motor 58 continues to operate through C9 which is located between leads o and p. The rapid feed motor 71 again is energized but in a reverse direction to its initial direction of rotation by the closing of contacts C10 in the reversed connecting lines 158a. The fine grinding tool spindle motor 133a is also energized by the closing of contacts C9 in its lines 157.

With the motors thus operating, the table 54 of the grinding device is rapidly moved towards the fine abrading tool 52 and upon reaching a predetermined point spaced a given distance from the tool 52, switch 101 is activated by cam 87 of Figs. 10 and 11. Switch 101 being of a double contact type similar to that of switch 92, then acts to open the circuit in lead x to de-energize R10 and close the circuit in lead y to energize R11.

By de-energizing R10, the rapid-feed motor 71 is de-energized and stopped by the opening of C10 in lines 158a and by energizing R11, the slow-feed motor 75 is energized to rotate in a reverse direction to its initial direction of rotation by the closing of contacts C11 in its leads from control unit 162. The closing of contacts C11 also connects variac 150 in circuit with the control unit 162 and motor 75. Switch 102, however, being in its opened position as illustrated, disconnects the rotor arm 150a of variac 150 to cause motor 75 to operate at its initial slow speed, thus continuing to move lens blanks L toward tool 52. At a point immediately prior to the engagement of lens blanks L with tool 52, however, cam 87, Figs. 10 and 11, actuates switch 102 to connect the rotor arm 150a into an electrical circuit through the variac 150 to then cause motor 75 through control unit 162 to operate at a still slower predetermined speed in accordance with the setting of said arm 150a. The finish generating of lens blanks L then proceeds until the desired depth of cut is reached at which time cam 87, of Figs. 10 and 11, actuates switch 103 which is also a double contact type similar to 101 and 92. Switch 103 then opens the circuit in lead y to de-energize R11 and closes the circuit in lead z to energize R12.

By so de-energizing R11, contacts 11 are opened and motor 75 is stopped and the variac 150 is again disconnected from the circuit through unit 162 to motor 75.

When R12 is energized, contacts C12 are operated and provide a closed circuit through a conventional timing device 163 such as a cycleflex timer or the like. This timing device provides a controlled delay in the movement of table 54 to permit the fine generating tool 52 to completely clear the RP surfaces of lens blanks L while table 54 remains momentarily stationary at the end of the feed cycle. This provides a superior fine generated finish on said RP surfaces.

By the closing of contacts 12, a circuit is provided through R8 to energize same. Said circuit is as follows: from transformer 160, lead a, lead b, lead l including now closed C2, lead v including now closed C3 and now closed C4, lead x including now closed C4, lead $x_1$, lead y including the now closed portion of switch 101 and C4, lead z through the now closed portion of switch 103, lead $a_1$ including now closed contact C12, lead g through R8, and lead e back to transformer 160. R8 will then be held in its energized condition by the closing of contact C8 in line g.

At the end of the timing cycle of timer 163, contact T in lead r which is operated by timer 163, closes. This energizes R13 and closes C13 in lead m. R13 is now energized through a circuit from transformer 160, lead a, lead b, lead r including now closed contact T and R13, lead e to transformer 160.

By closing contact C13 in lead m, relay R6 is again energized through a new circuit. Said circuit from transformer 160 passes through lead a, lead b, lead c including closed push buttons 154 and 155, lead g including closed switch 89 and now closed contact C8, lead m including now closed C13, lead n including the now closed portion of switch 92, R6 and lead e to transformer 160.

By thus energizing R6, contacts C6 will close in lines 158 to operate the rapid-feed motor 71 in its original starting direction of rotation to cause table 54 of the generating device to travel back toward its initial starting position midway between tools 51 and 52. Upon reaching said starting position, cam 87, Figs. 9 and 10, will then actuate switch 89 and open the circuit in lead g thus de-energizing R8 and consequently causing contact C8 to open and simultaneously open the circuit to R6 which will open contacts C6 on motor 71 to stop the table 54 at said starting position. The work-spindle motor 58 and the tool motor 133a had previously been stopped when relay 13 was energized since R13 had opened the normally closed contact C13 in lead j which de-energized R4 which, in turn, opened contact C4 in lead v to also de-energize R9. R9 then acted to open contacts C9 in the leads to both the motors 133a and 58.

The above-described automatic generating operation would then be again repeated by depressing the cycle start push button 151.

In order to jog the table 54 along its path of travel in either direction independently of the above automatic cycling operation for purposes of aligning the various parts of the machine during a setting up operation or the like, a pair of jog push buttons 154 and 155 are provided in the circuit. Said push buttons function to move table 54 by operation of motor 71 only when they are depressed and the movement instantly stops when they are released. It is pointed out that only the motor 71 can be operated by the jog push buttons 154 and 155.

The operation of push buttons 154 and 155 is as follows:

Push button 154 is used to jog the table 54 to the right or in the direction of tool 51. By depressing either button 154 or button 155, the electrical circuit to relays R1, R2, R3 and R4 which passes through lead c is opened thus preventing the automatic cycling operation, described above, from functioning. When the push button 154 is depressed, its second contact portion 154a which is interconnected therewith closes a direct circuit to relay R6 only when the switch 92 is in the position shown in Fig. 13, when the cam 87 (Figs. 9 and 10) is not in contact with switch 92.

Figure 14:
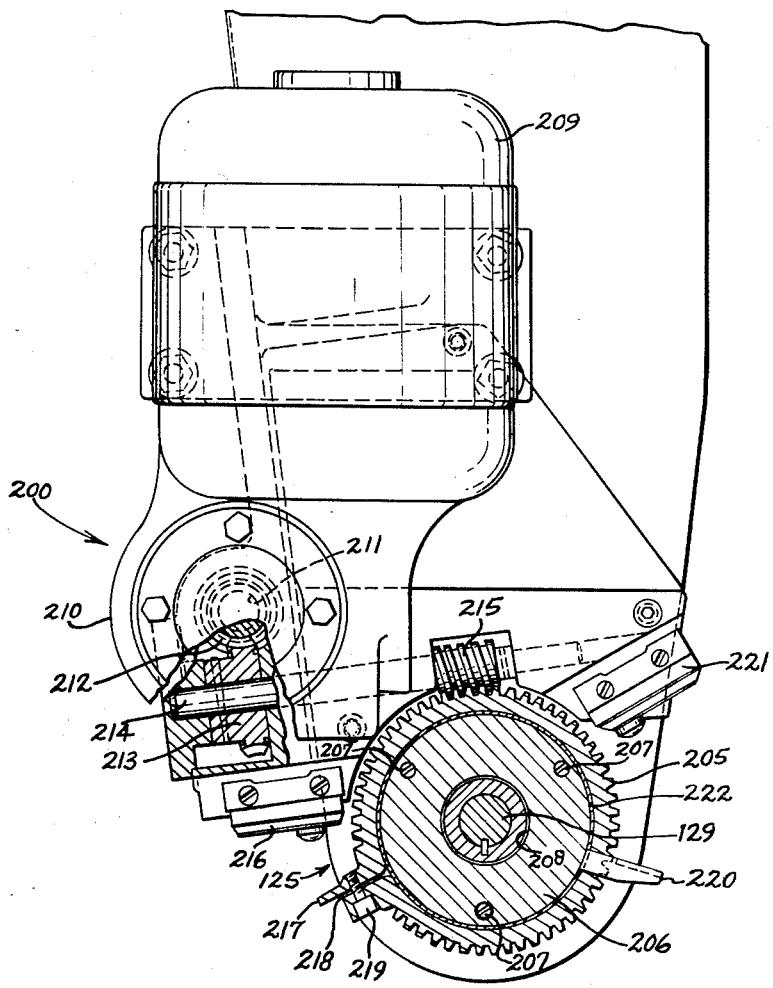
Fig. 14 is a fragmentary top plan view, partially in cross-section, of a modification of a part of the lens generating device which is illustrated in Figs. 4, 8, 9 and 10.

If it is desired to jog the fast-feed motor 71 to move table 54 to the right, switch 92 would be in the position illustrated in Fig. 14 whereupon the closed circuit to R6 would be from transformer 160 through lead a, lead b, lead n now including closed switches 154a and 92 through R6 and lead e to transformer 160.

As described previously, R6 closes contacts C6 in lines to motor 71 and contacts C6 operate to cause motor 71 to move table 54 towards tool 51. When the table 54 reaches a position where the switch 91 is engaged by the cam 87 (Figs. 10 and 11) the circuit to R6 is opened and contacts C6 are likewise opened to automatically stop the right-hand direction of travel of the table 54. At this time, however, the cam 87 is not in engagement with switch 101 and the table 54 can be jogged to the left or towards the tools 52 by operation of the jog push button 155 as follows:

The jog push button 155 operates in a manner identical to button 154 and its second contact 155a, when closed, energizes R10 when the switch 101 is closed as shown in Fig. 13. With switch 101 in the position illustrated and button 155 depressed, R10 would be energized through a circuit from transformer 160, lead a, lead b, lead y including now closed button 155a, lead x₁, lead x including closed portion of switch 101, R10 and lead e to transformer 160. With R10 energized, the contacts C10 will close to energize motor 71 in such manner as to drive the table 54 to the left and to the point where the cam 87 contacts switch 101 and opens the circuit in lead x to de-energize R10 and open contacts C10 to stop motor 71. It is pointed out that the jog push buttons 154 and 155 only function to operate motor 71 and with the cam 87 (Figs. 9 and 10) out of engagement with switches 92 or 101, said switches will automatically assume the positions shown in Fig. 13. Therefore, the table 54 can be jogged either to the right or left between the limits of switches 92 and 101 by operation of the respective jog buttons 154 or 155.

Push button 153 is positioned directly in the control circuit line for emergency purposes. That is, by depressing button 153, the complete control circuit is de-energized and all of the motors are instantly stopped. Upon releasing push button 153, the motors will remain de-energized since all the relays have been de-energized. However, the cycle may again be started by depressing the cycle start button 151.

Having generated the RP curve and lens blanks L in the manner described above, block B is then removed from the generating device. The generated RP surfaces thereof are then provided with an optically polished finish by means of a suitable polishing apparatus. A diagrammatic illustration of such an apparatus is shown in Fig. 12 wherein the block B is positioned upon one end of a rotatable shaft 165 journalled in a base 166 of said apparatus. Shaft 165 is powered by a pulley 166 and belt 172 which is, in turn, connected to any suitable source of power such as an electric motor or the like 167. A circular polishing pad 168, having a lens engaging surface preformed to substantially match the curvature of the lens surface to be polished and preferably formed of a suitable plastic composition or any of the conventional polishing materials known to the trade is positioned in engaged overlying relation with the above generated reading portion surfaces, as illustrated in Fig. 12. Said polishing pad 168 is mounted at one end of a supporting spindle 169 which is journaled in an angularly disposed supporting head 170 and is rotated about its axis by a pulley 171 and belt 172, which belt 172 functions to rotate both spindle 169 and shaft 165, as illustrated.

The curvature of the RP surfaces of the lens blanks L, having been formed as described above are monaxial with the curvatures of the reference surfaces 10 wherein both the centers of curvature of said RP and reference surfaces of each of said lens blanks lie on a common axis through the dividing line 12 thereof. Thus, the center of curvature of the generated RP curve on each of the lens blanks L is located on the axis of rotation 173 of block B at the point of intersection 174 of a plane through the dividing lines 12 of the blocked lens blanks L. It will be noted that the axis of spindle 169 is tilted about said center of curvature 174 to cause the lens engaging surface of the polishing pad 168 to properly seat upon the RP surfaces of lens blanks L. The polishing procedure is accomplished by simultaneous rotation of block B and polishing pad 168.

By the proper selection of a conventional polishing medium to be applied to the lens blanks L and polishing pad 168, the lens blanks and polisihng pad may be rotated at relatively high speeds to reduce the time of polishing.

The lens blanks L are then removed from block B.

It is pointed out that each of the above lens blanks L are subsequently finally finished as one piece multifocal lenses by grinding and polishing the concave sides thereof to predetermined curvatures such as to give the fields 10 and 11 predetermined optical powers controlled in accordance with the prescriptive requirements of particular individual wearers. The grinding and polishing of the concave sides of the lens blanks L may be accomplished by any one of the well-known conventional lens surfacing techniques used to form continuous optical surfaces on lens blanks.

Figure 15:
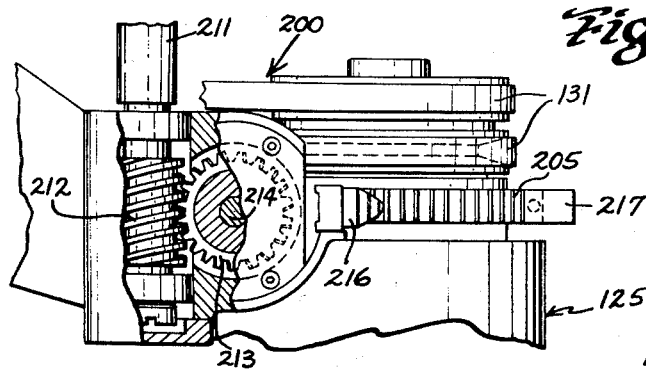
Fig. 15 is a fragmentary side elevational view, partially in section, of the modified part of the lens generating machine which is shown in Fig. 14.
Figures 16, 17, 18:
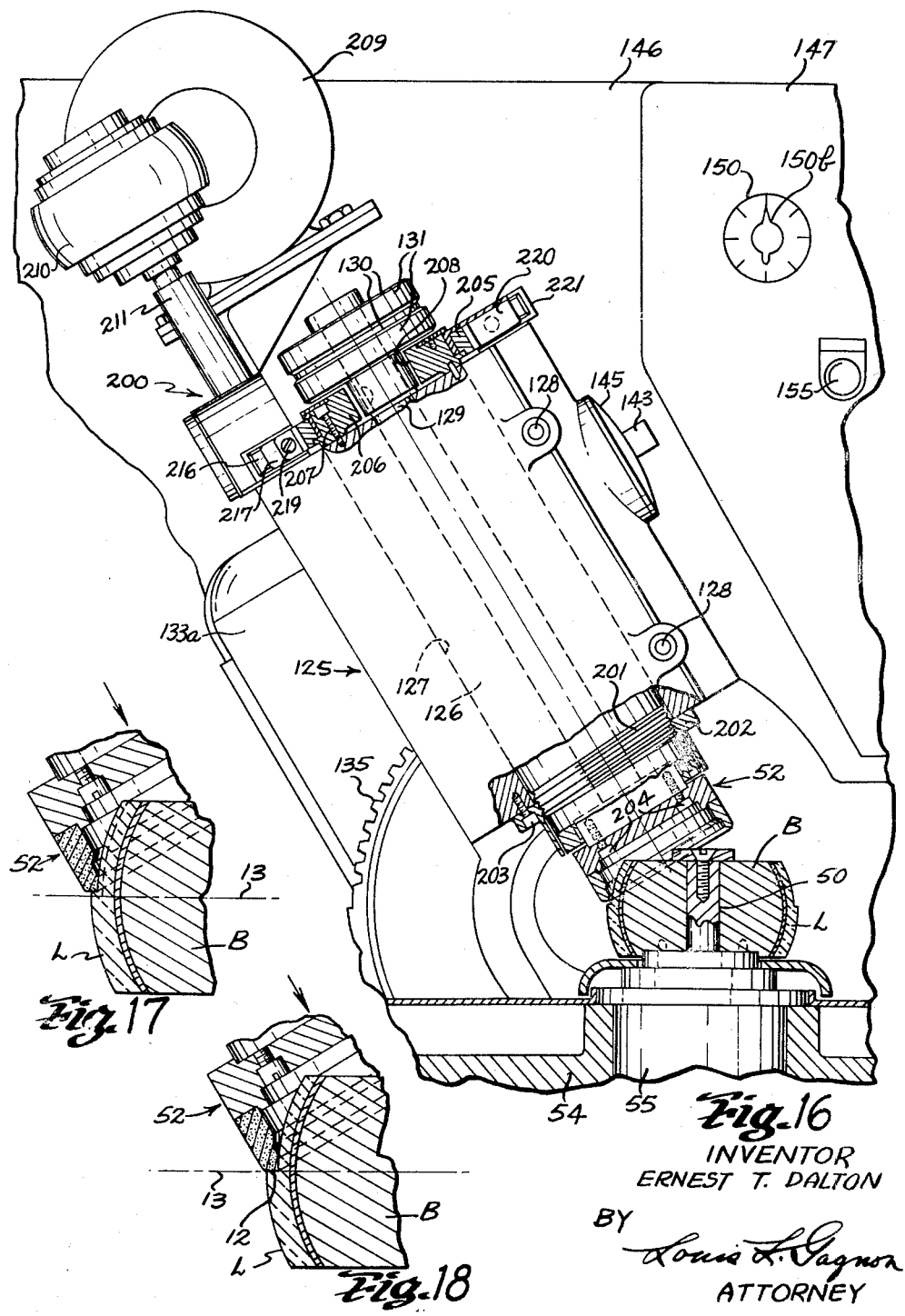
Fig. 16 is a fragmentary front elevational view shown partially in cross-section of the part of the device shown in Fig. 14.
Figs. 17 and 18 are diagrammatic illustrations of different stages in the lens generating operation which is performed with the lens generating device of the invention when said device is modified as shown in Figs. 14–16.

A modification of the above-described lens blank surface generating machine of Figs. 4, 8, 9 and 10 is illustrated in Figs. 14–18. This modification consists broadly of an auxiliary drive mechanism 200 which is provided on the head 125 of the generating machine to cause the fine abrading tool 52 and its associated spindle-supporting mechanism to be moved axially toward the lens blanks L on block B during the finish grinding of the RP surfaces thereof. By causing the tool 52 to fine abrade the lens blanks L with a plunge cut as by being moved in the direction of its axis rather than fine abrading the lens blanks by moving the same laterally into the tool, as described hereinabove, the finish abrading cycle can be considerably speeded up without detriment to the finally formed free edge of the dividing line 12 of the lens blanks since it will become apparent that the abrading edge of the tool 52 which forms the finished cliff-like dividing line 12 on the lens blanks does not finally reach the ultimate finished location of said dividing line 12 until the removal of substantially all of the material from the reading section of the lenses has been completed. Furthermore, with the lens-generating machine of the invention modified as shown in Figs. 14–16, uneven wear on the effective abrading edge of the finish abrading tool is substantially eliminated and a superior finished RP surface curvature is produced on the lens blanks which is of a true desired radius of curvature throughout the entire surface area of said RP surface including the area immediately adjacent the dividing line 12 of said lens blanks.

To more fully understand the specific function of the drive mechanism 200 and the advantages gained by so modifying the generating machine of Figs. 4, 8, 9 and 10, particular reference is made to Figs. 14–16 wherein it can best be seen in Fig. 16 that the spindle-supporting housing 126 of the head 125 has been somewhat modified at its opposite ends. The modification of the spindle housing 126 consists of a threaded area 201 adjacent its lower end which is threaddedly engaged in an internally threaded ring-like member 202 fixed to the underside of the head 125 by studs or the like 203. The spindle housing 126 is journalled in the bore 127 extending through the head 125 so that rotation of the housing 126 in one direction will cause its threaded area 201 to advance into the member 202 and lower the abrading tool 52 towards the block B whereas rotation of the spindle housing 126 in the opposite direction will raise the tool 52 away from block B. The tool 52 is fixed to the lower end of the spindle 126 by studs or the like 204 and the spindle 129 is independently rotatable within its housing 126, as described hereinabove with reference to Fig. 8.

Means to rotate the spindle housing 126 within the head 125 is provided at its upper end and comprises a split-ring gear 205, see Figs. 14, 15 and 16, in surrounding clamped relation with an adaptor 206 which is secured to the upper end of the spindle housing 126 by studs or the like 207. The adaptor 206 is provided with a central opening 208 through which the spindle 129 extends with sufficient clearance to permit the same to be independently rotated within its housing 126. The uppermost end of the spindle 129 is provided with the usual pulley 130 and belt 131 drive mechanisms shown in Figs. 4 and 8 by means of which the spindle 129 and its attached abrading tool 52 are continually rotated about their axes during the fine abrading of the lens blanks L.

Rotation of the spindle housing 126 to lower or raise the tool 52, as the case may be, relative to the blocked lens blanks L is brought about by operation of a conventional reversible electric drive motor 209 which is geared through a conventional reduction drive 210 to the ring gear 205 (see Figs. 14 and 15). The drive train from the reduction drive 210 to the ring gear 205 embodies a shaft 211 having a worm gear 212 adjacent its lowermost end in meshed relation with a worm follower 213 which is pinned or otherwise fixed to one end of a transversely extending shaft 214. The shaft 214 is journalled in the upper portion of the head 125 of the generating machine and carries a worm gear 215 which meshes with and drives the ring gear 205. Rotation of the motor 209 in one direction will revolve the ring gear 205, adaptor 206 and the spindle housing 126 about its longitudinal axis to cause its threaded part 201 to advance into the member 202 and lower the tool 52 towards the blocked lens blanks L when located thereunder. Rotation of the motor 209 in an opposite direction will cause the spindle housing 126 to be oppositely rotated and retracted from the threaded member 202.

In the generating of the RP surfaces on the lens blanks L with the lens-generating machine of the invention which has been modified as shown in Figs. 14, 15 and 16, the rough generating cycle is performed precisely as described hereinabove by first moving the blocked lens blanks L transversely into abrading relationship with the rough abrading tool 51 until a desired depth of cut is obtained whereupon the blocked lens blanks are withdrawn from the tool 51 and moved in the direction of tool 52 to be finish abraded by removing a desired amount of material from the rough abraded RP surfaces while simultaneously removing the excess of material adjacent the ultimate finished location of the dividing line 12 on the lens blanks L. As described in detail hereinabove, this excess of material is left on the lens blanks during the rough abrading thereof to protect the immediate area in which the dividing line 12 is to be finally formed by tool 52 from damage due to possible glass flaking which might be caused by the coarseness of the abrading particles of the rough abrading tool 51.

Having been rough abraded, the blocked lens blanks L are moved transversely towards tool 52 to the exact location or point at which the feed or motion of the lens blanks is stopped at the completion of the finish abrading cycle in the operation of the machine of Figs. 4, 8, 9 and 10 which was described in detail hereinabove. It is pointed out that this point at which the transverse movement of the lens blanks toward tool 52 is stopped, is such as to cause the axis of the spindle 129 and tool 52 to intersect the axis of the spindle 50 and block B at the point of intersection of the plane of the axes 13 of the lens blanks L on said block B (see Fig. 16). In this manner, the distance and reading fields of each of the finally finished lens blanks will be monaxial with their centers of curvatures lying on the axes 13, as shown more particularly in Fig. 2. During the movement of the block B towards the tool 52 as just described, the tool 52 is in a retracted or raised position so as to have its effective abrading edge in close proximity to the rough abraded surface of the lens blanks L when the blocked lens blanks reach and are stopped at the above-described exact location or point (see Fig. 16).

With the blocked lens blanks and the tool 52 in the relative positions illustrated in Fig. 16 and described above, the table 54 of the generating machine is held stationary during the finish abrading of the RP surfaces of the lens blanks L. Spindle 50 is rotated by motor 58 to revolve the block B and lens blanks L thereon about the axis of said spindle 50 and the tool 52 is simultaneously revolved about its axis by motor 133a. The motor 209 is energized and the tool 52 is moved into abrading relation with the lens blanks L by the threading of the spindle housing 126 into the member 202. Thus, the movement of the tool 52 is in a direction along its axis towards the lens blanks L. This movement is continued until the effective abrading edge of the tool 52 reaches the final depth of cut as illustrated in Fig. 18 wherein the dividing line 12 on the lens blanks has been finish abraded to a depth sufficient to locate said dividing line 12 on the axis 13 of the blanks. In referring more particularly to Figs. 17 and 18, it can be seen that the excess of material on the lens blanks adjacent the dividing line 13 which was left by the rough abrading operation is not completely removed at any point along the axis 13 until the removal of all the material from the RP surfaces is completed as shown in Fig. 18. Thus, the abrading side edge of the tool 52 which forms the dividing line 12 does not reach the ultimate desired location of the finished dividing line until the instant the finish depth of cut is completed. Because of this fact, the rate of removal of material during the finish abrading cycle can be considerably increased over that described above with reference to the generating machine of Figs. 4, 8, 9 and 10 which is not modified as shown in Figs. 14, 15 and 16 since any possible slight glass flaking which might result during the finish abrading of the lens blanks with the arrangement shown in Figs. 14, 15 and 16 will not take place at the ultimate desired location of the dividing line 12 on axis 13 due to the fact that the effective abrading edge of the tool which forms the dividing line 12 does not engage said location until the instant the final depth of cut is reached. Upon reaching the final depth of cut, the feed motor 209 is stopped and rotation of the tool 52 and block B is continued for a short dwell period to clear the fine abraded RP surfaces and produce a clean cut free edge and shoulder at the dividing line 12. This operation is referred to in the trade as a "sparking out" of the lens blank surfaces and produces a superior finish on the RP surfaces.

It is further pointed out that in addition to the speeding up of the fine generating cycle, unevenness in the wear on the tool 52 is avoided with the use of the arrangement shown in Figs. 14–16 since all parts of the effective abrading surface area of the tool 52 which form the RP radius of curvature are in constant engagement with the lens blank at all times. While the arrangement of Figs. 4, 8, 9 and 10 has produced very satisfactory results in the finish abrading of lens blanks, there is some tendency for the tool 52 to wear slightly unevenly during the abrading of the above-described excess of material left adjacent the axis 13 of the lens blanks. In moving the lens blanks into the tool 52, as described with reference to Figs. 4, 8, 9 and 10, the major portion of said excess of material must be abraded away before the complete inner radially shaped abrading face of the tool engages the rough abraded RP surfaces of the blanks. Thus, the outer portion of the tool 52 which first abrades the excess of material adjacent the axes 13 of the blanks tends to become slightly misshapen by wear with the result that a slight radius or error in the portion of the finished RP curve immediately adjacent the dividing line 12 might result.

With the arrangement shown in Figs. 14–16, such a condition is substantially completely avoided and a sharp and clean-cut joinder between the dividing line 12 and the finished RP surface is assured.

When the final depth of cut is reached by the tool 52 in the device of Figs. 14–16, the motor 209 is de-energized by the actuation of a micro-switch 216 which is engaged by a protruding stop member 217. The micro-switch 216 is fixed to the head 125 of the generating machine and the stop member 217 is formed as an integral outwardly projecting portion of the ring gear 205. The ring gear 205 which is split at 218 (see Fig. 14) is clamped together in secure gripping relation with the above-mentioned adaptor 206 by a screw or the like 219 and is initially rotatably adjusted about the adaptor 206 to a position such as to activate the switch 216 at the instant the desired depth of finish cut on the lens blanks is produced by the tool 52.

After having finally reached the desired depth of finish cut on the lens blanks wherein the motor 209 is de-energized, the above-mentioned slight dwell period is provided to produce a superior finish on the RP surfaces of the lens blanks and at the completion of the dwell period, the table 54 of the generating machine is withdrawn from the tool 52 by being moved transversely back to its initial starting position centrally between the tools 51 and 52, as shown in Fig. 8. At the same time, the motor 209 is energized to rotate the spindle housing in such a direction as to retract the housing and return the tool 52 to a position such as shown in Fig. 16 wherein it will again be ready to receive other lens blanks to be finish abraded as described above.

In order to accuraely locate the tool 52 in a raised position so as to properly receive the lens blanks, as shown in Fig. 16 and as described above, prior to each finish abrading operation, a second stop member 220 is provided in clamped relation between the ring gear 205 and the adaptor 206 so as to rotate with the ring gear, adaptor and spindle housing assembly. The second stop member 220 is adapted to engage and thereby activate a second micro-switch 221 which is fixed to the head 125 and de-energize the motor 209 when the tool 52 is retracted or raised to the above-described proper position. The stop member 220 is an outwardly projecting part of a shim-like collar member 222 which is fitted between the ring gear 205 and the adaptor 206 and said stop member is initially radially adjusted relative to the stop member 217 and switch 201 about the axis of the spindle housing 206 by loosening the clamp screw 219 of the ring gear 205. With the stop members 217 and 220 properly adjusted relative to each other and to their respective micro-switches 216 and 221, the clamp screw 219 is tightened to securely clamp the respective parts of the above assembly together.

It is pointed out that upon completion of the finish abrading cycle just described, the lens blanks are deblocked and further processed as by polishing with the device of Fig. 12 in precisely the same manner as described hereinabove.

Figure 19:
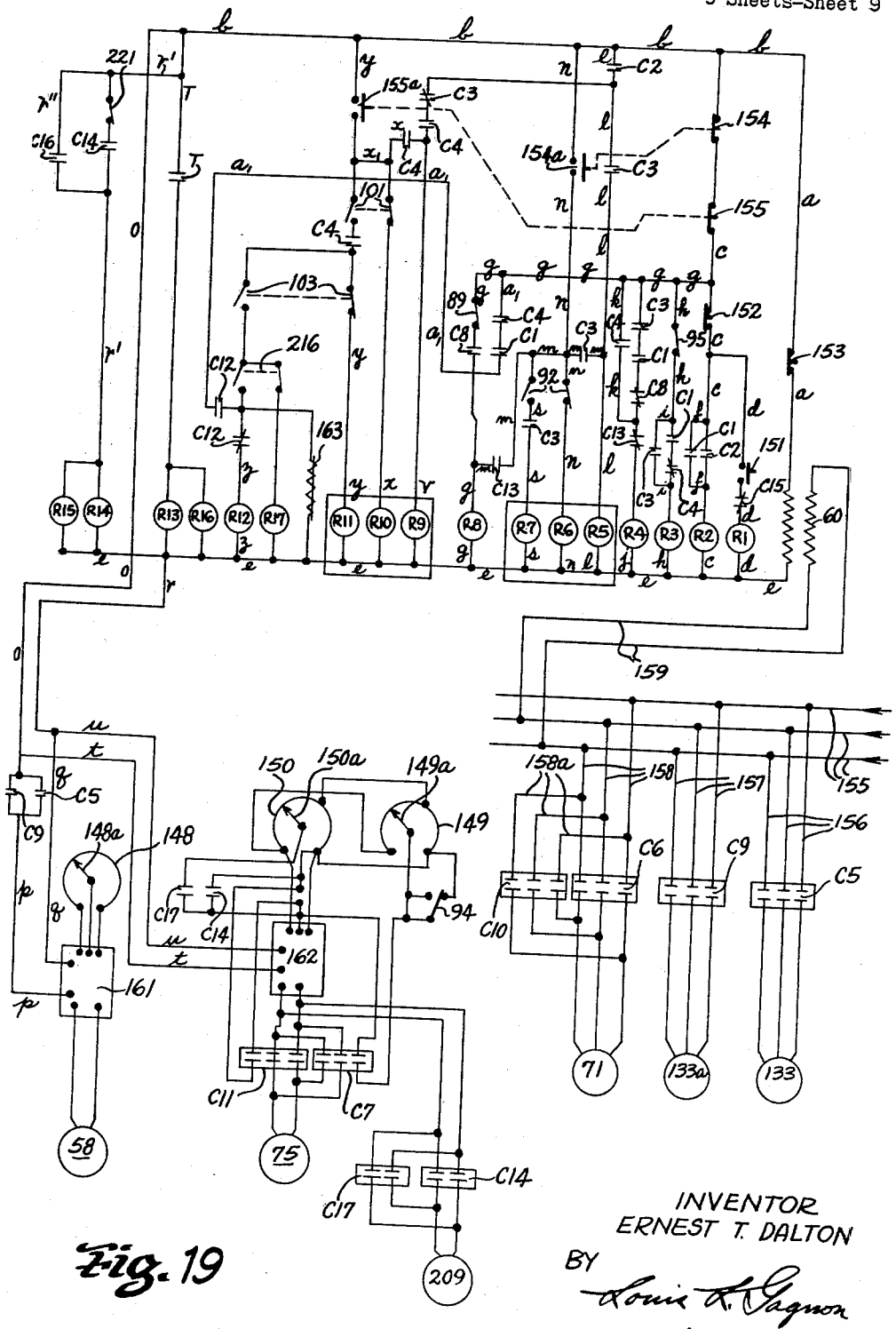
Fig. 19 is an electrical diagram which schematically illustrates the circuitry involving the electrical operation of the modification of the invention shown in Figs. 14–16.

In adapting the auxiliary drive mechanism 200 of Figs. 14, 15 and 16 to the generating machine of Figs. 4, 8, 9 and 10, a modification of the electrical system shown in Fig. 13 is required and this modification is illustrated in Fig. 19, wherein the contacts C14, C15, C16, C17, switches 216 and 221, relays R14, R15, R16, R17 and motor 209 have been added to the electrical system shown in Fig. 13.

As stated hereinabove, the rough generating of the RP surfaces on the lens blanks L with the lens generating machine of the invention which has been modified as shown in Figs. 14, 15 and 16 is performed precisely as described with regard to Fig. 13.

After the completion of the rough generating cycle, the table 54 of the generating machine automatically moves to the left or towards tool 52 by operation of the motor 71. Upon approaching the vicinity of the tool 52, the cam 87 (Figs. 9 and 10) engages the micro-switch 101 which acts to de-energize relay R10 by opening the circuit through line x. At the same time, switch 101 being of the double contact type as shown in Fig. 19, closes the circuit in line y to energize relay R11. Upon energizing R11, its associated contacts C11 are immediately closed and motor 75 is energized to continue the movement of table 54 towards the tool 52 to the point where the cam 87 engages micro-switch 103 (Figs. 9, 10 and 19), which, in turn, opens the circuit in line y to de-energize relay R11 and thereby open its associated contacts C11 to de-energize motor 75 and stop the table 54. The table 54 is, at this time, located in a position such as illustrated in Fig. 16. As described in detail hereinabove, this position at which the table 54 is stopped is such as to cause the axis of tool 52 to intersect the axis of block B at a point thereon which lies in the plane of the axes 13 of the lens blanks L on the block B. The switch 103 being of the double contact type as described with reference to Fig. 13 and as shown in Fig. 19, closes the circuit in line z when engaged by cam 87. The closing of the circuit in line z then energizes R17 through the normally closed portion of switch 216 which is of the double contact type as illustrated. R17 being energized causes its associated contact C17 in the circuit to motor 209 to become closed. At the same time, the contacts C17 in the circuit to the variac 150 are closed thereby connecting the rotor arm 150a in circuit with the unit 162 and motor 209. In so doing, motor 209 will rotate the spindle housing 126 and thereby lower the tool 52 towards the lens blanks L in a direction along the axis of tool 52. It is pointed out that the speed at which the motor 209 operates is controlled by the preselected positioning of the rotor arm 150a of the variac 150. The operation of motor 209 continues until a desired depth of finish cut on the lens blanks L is achieved, at which time the stop member 217 on the drive gear 205 (see Figs. 14 and 16), engages micro-switch 216 to open the circuit through R17 and de-energizes the same (see Fig. 19) whereby the above-mentioned contacts C17 will, accordingly, be opened and the motor 209 will be de-energized thereby stopping the downward travel of the spindle housing 126 and tool 52. Switch 216, being of the double contact type, as shown in Fig. 19, when actuated by the stop member 217 automatically closes the circuit through line z to energize R12. When energized, R12 closes the normally opened contact C12 to complete a circuit through the timer 163 to start the same and provide the above-described dwell period wherein continued rotation of the block B and the tool 52 about their respective axes will "clear" the fine abraded RP surfaces of the lens blanks to produce a superior finish thereon. At the end of the dwell period, the timer 163 will automatically close contact T in line r which will cause relays R13 and relay R16 to become energized.

Upon being energized, R13 closes contact C13 in line m to energize R8 and R8, in turn, closes contact C8 in line g to hold R8 in its energized condition by the circuit in line g through switch 89 and C3. The energizing of R8 also causes contact C8 in line j (which is normally closed) to open and thereby de-energize R4 which causes its normally closed associated contact C4 in line h to close and energize R3 by the circuit through line h. With R3 energized and its associated contact C3 in line s closed, R7 will be energized causing contact C7 in the leads to motor 75 to close. This starts motor 75 and causes the table 54 to move to the right or in the direction of tool 51. Upon reaching the approximate center of the machine or location at which the lens block B was positioned at the beginning of the lens abrading cycle before being rough abraded by tool 51, the cam 87 (see Figs. 9, 10, 19) will strike micro-switch 89 causing the same to open the circuit in line g and thereby de-energize R8. When R8 is de-energized, its associated contact C8 in line j will return to its normally closed position so as to again energize R4. Immediately upon energizing R4, its associated normally closed contact C4 in line h, opens to de-energize R3. The de-energizing of R3 causes its associated contact C3 in line s to open and thereby de-energize R7 which stops motor 75 by opening contacts C7 in the leads to said motor. In the meantime, R16 which was energized by the closing of contact T had caused contact C16 in line r" to close and energize R14 and R15 through lines r' and r". The energizing of R14 closes contact C14 and thereby provides a hold circuit for R14 and R15 through line r', switch 221 and C14. At the same time, the energizing of R14 causes contact C14 in the lines to motor 209 to close and energize motor 209 causing the same to operate in such a direction as to raise the spindle housing 126 and tool 52 away from the block B and lenses L in a direction along the axis of tool 52. It will be noted that along with the closing of the above-mentioned contact C14 in the lines to motor 209, another contact C14 is simultaneously closed in the circuits associated with variac 150 to cause the rotor arm 150a of variac 150 to be bypassed thus causing motor 209 to operate at its maximum speed. During the time interval in which motor 209 operates to raise the spindle housing 126 and tool 52, R15 (being in an energized condition) operates to hold open its normally closed associated contact C15 in line *d* thereby disconnecting R1 from the circuit in line *d* so as to prevent accidental starting of the previously described machine cycling which might be caused by accidentally engaging the cycle start button 151.

At the time the tool 52 reaches a position wherein it is raised a desired amount such as described hereinabove, the stop member 220 (see Figs. 14 and 16) engages and opens micro-switch 221 (see Figs. 14, 16 and 19), which is normally closed in line *r'*. Upon opening the micro-switch 221, R14 and R15 will be de-energized and return contact C14 to its normally open condition to stop motor 209 while at the same time contact C15 will be returned to its normally closed condition wherein the machine is again ready to begin another complete abrading operation. As described hereinabove with relation to Fig. 13, the automatic cycling of the machine is initiated by actuating the cycle start button 151.

With the generating cycle completed and the table 54 of the generating machine now moved to and stopped at a position such as to locate the block B approximately midway between the tools 51 and 52, the block B is removed from the spindle 50 and placed upon the apparatus of Fig. 12 wherein the abraded RP surfaces of the lens blanks L are optically polished as described in detail hereinabove.

From the foregoing, it can be seen that means have been provided for accomplishing all of the objects and advantages of the invention. Nevertheless, it should be apparent that many changes in the details of construction and arrangement of parts may be made without departing from the spirit of the invention as expressed in the accompanying claims and the invention, therefore, is not to be limited to the exact matters shown and described as only the preferred matters have been given by way of illustration.

Having described my invention, I claim:

1. A device of the character described for abrading lens blanks comprising a base having a transversely slidable table mounted thereon, a spindle rotatably supported on said table, a wheel-type lens block mounted on said spindle and having a plurality of attached lens blanks about its periphery, said blanks having continuous surfaces substantially equally radially spaced from the axis of rotation of said spindle and having the axes upon which their respective centers of curvatures lie intersecting a given point on said axis of said spindle, a pair of rotatable abrading tools pivotally supported on said base and angled relative to the axis of the spindle to produce a given radius of curvature on said lens blanks when in abrading relation therewith, a first of said tools having a relatively coarse effective abrading portion for performing a rough abrading operation and a second of said tools having a relatively fine effective abrading portion for performing a fine abrading operation and means for selectively moving said blocked lens blanks laterally into engagement with said first tool a distance sufficient to produce a desired coarse depth of cut on said blanks, means for retracting said blanks from said first tool and moving the same laterally toward said second tool, means for stopping said movement toward said second tool when the axis of said second tool intersects said point on said axis of said spindle and means for moving said second tool along its axis into engagement with said blanks a distance sufficient to provide a desired finished depth of cut on said blanks.

2. A device of the character described for abrading lens blanks comprising a base having a transversely slidable table mounted thereon, a spindle rotatably supported by said table, means for rotating said spindle, a wheel-type lens block of a controlled diameter mounted on said spindle and having a plurality of lens blanks attached throughout the periphery thereof, each of said blanks having an exposed curved surface thereon substantially equally spaced from the axis of said spindle, said curved surfaces having their respective centers of curvature lying in a plane substantially normal to and intersecting a given point on said axis of said spindle, a rotatable abrading tool pivotally supported on said base to one side of said spindle and having its axis of rotation lying in the same plane as the axis of said spindle and angled a controlled amount to cause an effective abrading portion of said tool to face said lens blanks, said effective abrading portion of said tool when at said angle, being such as to produce a given spherical radius of curvature on a substantial portion of said curved surfaces of said blanks while simultaneously producing a cliff-like edge across said lens blanks when in abrading relation therewith, means for rotating said tool, means for moving said lens blanks and tool, one toward the other, during the rotation thereof so as to position said axis of said tool in substantially intersecting relation with said given point on said axis of said spindle and means for moving said tool along its axis into engagement with said blanks a distance sufficient to produce a desired depth of cut on said portions of said curved surfaces and simultaneously produce said cliff-like edge across said blanks.

3. A lens blank generating device of the character described comprising a base having a transversely slidable table mounted thereon, a spindle rotatably supported on said table, a wheel-type lens block mounted on said spindle and having a plurality of attached lens blanks about its periphery, said blanks having continuous curved surfaces substantially equally radially spaced from the axis of rotation of said spindle and having the respective centers of curvatures of said curved surfaces lying in a plane substantially normal to and intersecting a given point on said axis of said spindle, a pair of rotatable cupped abrading tools, one at each side of said spindle, pivotally supported on said base with their axes of rotation lying in a common plane with the axis of the spindle and angled to produce a given radius of curvature on said lens blanks when in abrading relation therewith, a first of said tools having a relatively coarse effective abrading edge portion for performing a rough abrading operation and tilted about a point on its edge portion in said common plane to face said lens blanks, a second of said tools having a relatively fine abrading edge portion for performing a fine abrading operation and tilted oppositely to said one of said tools about a point on its edge portion in said common plane to face said lens blank, means for moving said blocked lens blanks and first tool laterally, one toward another, a distance such as to bring said lens blanks first into abrading relation with said coarse abrading tool and produce a desired coarse depth of cut on a controlled substantial portion of said curved surfaces thereof, means for retracting said blanks from said first tool and moving said blanks and second tool laterally, one toward the other, to cause said axis of said second tool to substantially intersect said given point on said axis of said spindle and means for moving said second tool in a direction along its axis into abrading relation with said blanks a distance sufficient to produce a desired fine abraded finished depth of cut on said controlled portions of said curved surfaces of said blanks.

4. A lens blank abrading device of the character described comprising a base having a transversely slidable table mounted thereon, a spindle rotatably supported on said table, a wheel-type lens block mounted on said spindle and having a plurality of attached lens blanks about its periphery, said blanks having exposed continuous curved surfaces substantially equally spaced from the axis of rotation of said spindle and having the respective centers of curvatures of said curved surfaces lying in a plane substantially normal to and intersecting said axis of said spindle at a given location thereon, a pair of rotatable cupped abrading tools, one at each side of said spindle, pivotally supported on said base with their axes of rotation lying in a common plane with the axis of said spindle, said tools being angled relative to said lens blanks in such manner as to produce a given radius of curvature on said lens blanks when in abrading relation therewith, one of said tools having a relatively coarse effective abrading portion for performing a rough abrading operation and tilted about a point on an edge of its effective abrading portion in said common plane to face said lens blanks, said edge portion functioning to produce a coarse finished cliff-like edge across said curved surfaces of said blanks and said point being located slightly above said plane of the centers of curvature of the lens blanks, the other of said tools having a relatively fine abrading portion for performing a fine abrading operation and tilted oppositely to said one of said tools about a point on an edge of its effective abrading portion so as to face said lens blanks at approximately the same angle as said one of said tools, said edge portion of said fine abrading tool functioning to produce a fine finished cliff-like edge across said curved surfaces of said blanks, means for moving said blocked lens blanks first into abrading relation with said coarse abrading tool an amount sufficient to cause the axis of rotation of said coarse abrading tool to nearly intersect said axis of said given spindle at the point thereon means for moving said lens blanks and fine abrading tool, one toward the other, an amount sufficient to cause the axis of rotation of said fine abrading tool to intersect said axis of the spindle at said given location of the point of intersection of the plane of the centers of curvatures of the blanks with said axis of the spindle and means for moving said second tool along its axis of rotation into abrading relation with said blanks a distance such as to produce a desired depth of finished cut on said blanks and simultaneously produce said fine finished cliff-like edge across said curved surfaces of said blanks.

5. Lens blank abrading apparatus of the character described comprising a base having a transversely slidable table thereon, a rotatable spindle supported on said table, means for rotating said spindle, a wheel-type block detachably mounted on said spindle for rotation therewith and having a plurality of attached lens blanks about its periphery, said blanks having exposed reference surfaces substantially equally spaced from the axis of rotation of said block and with their respective centers of curvature lying in a plane normal to and intersecting said axis of rotation, a pair of rotatable cupped abrading tools pivotally mounted on said base, one at each side of said block, and each having a controlled shape abrading edge portion, means for rotating said tools about their respective axes, the axes of rotation of said tools being disposed in a common plane with the axis of rotation of said block, the first of said tools having a relatively coarse effective abrading edge portion tilted relative to the axis of the block about a point in said common plane located on its abrading edge portion slightly above the plane of the centers of curvature of the blanks, the second of said tools having a relatively fine abrading edge portion and tilted in a direction opposite to said first tool, the angles of tilt of said first and second tools being such as to cause a substantially spherical surface curvature to be generated upon said blanks when said tools and lens blanks are moved one relative to the other into engagement with each other, means for moving said blocked lens blanks initially towards said first tool to feed the lens blanks into the tool a distance in accordance with a controlled depth of cut to be produced on said blanks by said first tool, means for stopping said movement upon reaching said controlled depth of cut and simultaneously acting means for causing said block and blanks to retract from said first tool and move in a reverse direction in said common plane towards said second tool, means for stopping said movement towards said second tool when said axes of said block and second tool and said plane of the centers of curvature of said reference surfaces all intersect each other at a common point, means for moving said second tool along its axis into abrading relation with said lenses to produce a predetermined depth of finish cut on said lenses, means for stopping said movement of said second tool when said predetermined depth of cut is reached, means for holding said second tool at said stopped position for a predetermined dwell period while continuing the rotation of said lenses and second tool to cause said second tool to true up the area of the lens blanks generated thereby and means for moving said block and blanks away from said second tool and stopping same at its initial starting position.

6. Lens blank abrading apparatus of the character described comprising a base having a transversely slidable table thereon, a rotatable spindle supported on said table, means for rotating said spindle, a wheel-type block detachably mounted on said spindle for rotation therewith and having a plurality of attached lens blanks about its periphery, said blanks having exposed curved surfaces substantially equally spaced from the axis of rotation of said block and with their respective centers of curvature lying in a plane normal to and intersecting said axis of rotation at a given point thereon, a pair of rotatable cupped abrading tools pivotally mounted on said base, one at each side of said block, and each having a controlled shaped abrading portion, means for rotating said tools about their respective axes, the axes of rotation of said tools being disposed in a common plane with the axis of rotation of said block, the first of said tools having a relatively coarse effective abrading portion tilted relative to the axis of the block about a point in said common plane located on an edge of its abrading portion slightly above the plane of the centers of curvature of the blanks, the second of said tools having a relatively fine abrading portion and tilted in a direction opposite to said first tool about a point located on an edge of its abrading portion in said common plane, the angles of tilt of said first and second tools being such as to cause a substantially spherical surface curvature to be generated upon said blanks when said tools and blanks are rotated and moved into engaging abrading relation with each other, means for moving said block and blanks towards said first tool to feed the blanks into said first tool a distance in accordance with a controlled depth of cut to be produced on said blanks by said first tool, means for stopping said movement upon reaching said depth of cut and simultaneously acting means for causing said block and blanks to retract from said first tool and move in a reverse direction in said common plane towards said second tool a distance such as to cause said axis of rotation of said second tool to intersect said given point on said axis of rotation of said spindle, means for moving said second tool in a direction toward said lens blanks along its axis of rotation a distance sufficient to produce a controlled depth of cut on said lens blanks by said second tool, means for stopping said axial movement of said second tool upon reaching said controlled depth of cut for a given dwell period sufficient to cause said tool to true up the generated surfaces of said blanks and means for relatively rapidly moving said block and blanks away from said second tool and stopping same at its initial starting position.

7. Lens blank abrading apparatus of the character described comprising a base having a transversely slidable table thereon, a rotatable spindle supported by said table, means for rotating said spindle, a wheel-type block detachably mounted on said spindle for rotation therewith and having a plurality of lens blanks attached about its periphery, each of said blanks having an exposed reference surface thereon substantially equally spaced from the axis of rotation of said block and having their respective centers of curvature lying in a plane normal to and intersecting said axis of rotation of the block, a pair of rotatable cupped abrading tools pivotally mounted on said base, one at each side of said block, and each having a controlled shaped effective abrading portion, means for rotating said tools about their respective axes, the axes of rotation of said tools being in a common plane with and intersecting the axis of rotation of said block, the first of said tools having a relatively coarse effective abrading portion tilted relative to the axis of the block about a point slightly above the plane of the centers of curvature of the blanks, the second of said tools having a relatively fine abrading edge portion tilted equally and in a direction opposite to said first tool, the angles of tilt of said first and second tools being such as to cause a substantially spherical surface curvature to be generated upon said blanks by said tools when they are rotated and positioned in abrading relation with the blanks, means for moving said block and blanks relatively rapidly initially towards said first tool and means for substantially reducing the rate of travel of said rapid movement at a predetermined distance near the point of engagement of said blanks with said first tool, means for further reducing the said rate of travel immediately prior to the point of engagement of said blanks with said first tool and continuing said further reduced rate of travel to feed the blanks into the tool an amount sufficient to cause the axis of rotation of the block to nearly intersect the axis of rotation of said first tool at the plane of the centers of curvature of the blanks to provide a desired coarse depth of cut in said blanks, means for stopping said movement upon reaching said desired depth of coarse cut and simultaneously acting means for causing said block and blanks to retract from said first tool and move relatively rapidly in a reverse direction along said common plane towards said second tool, means for stopping said movement towards said second tool when the axis of said second tool passes through the point of intersection of the axis of said block with the plane of the centers of curvature of the blanks, means for moving said second tool along its axis into engagement with said blanks a distance sufficient to provide a desired finish depth of cut in said blanks, means for stopping said movement of said second tool toward said lens blanks upon reaching said desired depth of cut and holding the same so positioned for a given dwell period sufficient to cause said tool to true up the surfaces of the lens blanks abraded thereby and means for relatively rapidly moving said block and blanks away from said second tool and stopping same at its initial starting position.

8. Apparatus for simultaneously forming a plurality of one-piece multifocal lens blanks having areas which constitute different focal fields and a cliff-like dividing line between said areas, said lens blanks initially having a continuous curved reference surface on one side thereof corresponding to the curvature desired on a first area thereof, said apparatus comprising a base, a transversely sidable table on said base, a rotatable spindle carried by said table, a wheel-type lens block mounted on said spindle and having a plurality of said lens blanks attached thereon about its periphery with the continuous curved reference surfaces thereof exposed and substantially equally radially spaced from the axis of rotation of said spindle and with the axes upon which their respective centers of curvatures lie intersecting the axis of said spindle at a given point thereon, a pair of rotatable abrading tools, one at each side of said spindle, pivotally supported on said base with their axis of rotation lying in the same plane as the axis of the spindle and angled to produce a given radius of curvature on said lens blanks when in abrading relation therewith, a first of said tools having a relatively coarse effective abrading portion for performing a rough abrading operation and a second of said tools having a relatively fine effective abrading portion for performing a fine abrading operation, means for selectively moving said blocked lens blanks and said first tool one toward another to bring said lens blanks into abrading relation with said coarse abrading tool for forming a coarse abraded predetermined radius of curvature on a substantial portion of each of said reference surfaces of said blanks to form said areas which constitute different focal fields and for simultaneously forming, by coarse abrasion, said cliff-like line of division between said areas, means for moving said lens blanks and second tool, one toward the other, to position said axis of rotation of said second tool in intersecting relation with said given point on said axis of said spindle and means for moving said second tool toward said lens blanks along its axis of rotation a distance sufficient to produce a finished fine abraded depth of cut on said initially coarse abraded areas of said blanks while simultaneously fine abrading said cliff-like line of division between said areas.

9. Means for simultaneously forming a plurality of multifocal lens blanks having areas which constitute different focal fields and a cliff-like dividing line between said areas, said blanks initially having a continuous curved reference surface on one side thereof corresponding to the curvature desired on a first area of the finished lens blanks, comprising the combination of means for mounting said blanks on a wheel-type block with the axes of said reference surfaces intersecting the axis of said block and with said reference surfaces exposed and spaced from said axis a distance in accordance with the radius of curvature to be formed on another of said areas of said blanks, and abrading means for forming said other areas of said blanks embodying a base, a transversely movable table on said base, a rotatable spindle carried by said table for receiving said wheel-type block, a pair of rotatable tools, one at each side of said spindle, pivotally supported on said base with the axes of rotation lying in the same plane as the axis of said spindle and angled to produce a given radius of curvature on said lens blanks when in abrading relation therewith, one of said tools having a relatively coarse effective abrading portion for performing a rough abrading operation and the other of said tools having a relatively fine effective abrading portion for performing a fine abrading operation, means for selectively moving said blocked lens blanks and tool having said coarse abrading portion, one toward another, when said block is mounted axially on said spindle to bring said lens blanks into abrading relation with said coarse abrading tool for forming a coarse abraded predetermined radius of curvature on said other area of each of said blanks while simultaneously forming by coarse abrasion said cliff-like line of division between said areas, means to bring said lens blanks and fine abrading tool into a predetermined positional relation with each other such as to permit fine abrasion of said areas by movement of said fine abrading tool along its axis toward said blanks and means for moving said fine abrading tool along its axis into abrading relation with said areas of said blanks to fine abrade the same and simultaneously produce a fine abrasion of said cliff-like line of division.

References Cited in the file of this patent
UNITED STATES PATENTS

| | | |
|---|---|---|
| 2,286,361 | Goddu | June 16, 1942 |
| 2,643,491 | Burroughs | June 30, 1953 |
| 2,649,667 | Cooke | Aug. 25, 1953 |